US011325595B2

(12) United States Patent
Tanaka et al.

(10) Patent No.: US 11,325,595 B2
(45) Date of Patent: May 10, 2022

(54) VEHICLE

(71) Applicant: TOYOTA JIDOSHA KABUSHIKI KAISHA, Toyota (JP)

(72) Inventors: Takayoshi Tanaka, Shizuoka (JP); Yuji Nishi, Nagoya (JP); Tomoaki Koshikawa, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 61 days.

(21) Appl. No.: 16/865,557

(22) Filed: May 4, 2020

(65) Prior Publication Data

US 2020/0369269 A1 Nov. 26, 2020

(30) Foreign Application Priority Data

May 24, 2019 (JP) .............................. JP2019-097533

(51) Int. Cl.
*B60W 30/095* (2012.01)
*G08G 1/00* (2006.01)
*G08G 1/01* (2006.01)
*G05D 1/02* (2020.01)

(52) U.S. Cl.
CPC ....... *B60W 30/0956* (2013.01); *G05D 1/0219* (2013.01); *G05D 1/0293* (2013.01); *G08G 1/0112* (2013.01); *G08G 1/0145* (2013.01); *G08G 1/20* (2013.01); *G08G 1/22* (2013.01); *G05D 2201/0213* (2013.01)

(58) Field of Classification Search
CPC ............ B60W 30/0956; G05D 1/0219; G05D 1/0293; G05D 2201/0213; G08G 1/0112; G08G 1/0145; G08G 1/20; G08G 1/22
See application file for complete search history.

(56) References Cited

U.S. PATENT DOCUMENTS

| 4,965,878 | A | * | 10/1990 | Yamagiwa | ........... B60G 17/016 180/41 |
| 8,797,828 | B1 | * | 8/2014 | Lev | .................. G01V 11/00 367/64 |
| 2002/0005304 | A1 | * | 1/2002 | Bachman | ................ B60L 3/102 180/65.22 |
| 2002/0042668 | A1 | * | 4/2002 | Shirato | .............. G06K 9/00798 701/1 |
| 2002/0131620 | A1 | * | 9/2002 | Shirato | .............. G06K 9/00798 382/104 |

(Continued)

FOREIGN PATENT DOCUMENTS

| JP | 2009-157793 A | 7/2009 |
| JP | 2010-176353 A | 8/2010 |

*Primary Examiner* — Hussein Elchanti
(74) *Attorney, Agent, or Firm* — Sughrue Mion, PLLC

(57) ABSTRACT

In vehicle platooning, when road surface information is received from a preceding vehicle, an ECU determines whether a specific spot on a road included in the road surface information can be avoided. That is, the ECU determines whether avoidance control can be performed. When it is determined that the avoidance control can be performed, the ECU transmits the road surface information received from the preceding vehicle to a following vehicle, and performs the avoidance control to avoid the specific spot on the road. In contrast, when it is determined that the avoidance control cannot be performed, the ECU ends a process without performing the avoidance control.

8 Claims, 15 Drawing Sheets

(56) References Cited

U.S. PATENT DOCUMENTS

| | | | |
|---|---|---|---|
| 2010/0231718 A1* | 9/2010 | Nakamori | G06K 9/00798 348/148 |
| 2010/0235035 A1* | 9/2010 | Nishira | G08G 1/165 701/31.4 |
| 2011/0187515 A1* | 8/2011 | Saito | B60T 7/22 340/425.5 |
| 2011/0313665 A1* | 12/2011 | Lueke | G01S 13/931 701/301 |
| 2013/0314503 A1* | 11/2013 | Nix | G06K 9/00805 348/46 |
| 2015/0166062 A1* | 6/2015 | Johnson | B60W 10/20 701/41 |
| 2015/0353008 A1* | 12/2015 | Kline | G08G 1/162 340/993 |
| 2016/0231747 A1* | 8/2016 | Neff | G05D 1/0231 |
| 2016/0282874 A1* | 9/2016 | Kurata | G05D 1/0274 |
| 2016/0302046 A1* | 10/2016 | Velusamy | G08G 1/0133 |
| 2016/0321924 A1* | 11/2016 | Lewis | B60W 30/02 |
| 2018/0211529 A1* | 7/2018 | Kaur | G08G 1/0133 |
| 2020/0160626 A1* | 5/2020 | Lei | H04W 4/40 |
| 2020/0166941 A1* | 5/2020 | Yu | G08G 1/096741 |
| 2020/0346654 A1* | 11/2020 | Kojo | B60W 40/06 |

* cited by examiner

VEHICLE

This nonprovisional application is based on Japanese Patent Application No. 2019-097533 filed on May 24, 2019, with the Japan Patent Office, the entire contents of which are hereby incorporated by reference.

BACKGROUND

Field

The present disclosure relates to a vehicle.

Description of the Background Art

In recent years, various studies have been made on a plurality of vehicles travelling in a platoon, or vehicle platooning. For example, Japanese Patent Application Laid-Open No. 2009-157793 discloses a vehicle that adjusts its vehicular height based on vehicular information of a preceding vehicle traveling ahead thereof in platooning. The vehicle adjusts its vehicular height so as to accommodate the vehicle within the preceding vehicle's projection plane to reduce the wind pressure that the vehicle receives as it travels, and thus suppress energy consumption.

SUMMARY

In order to ensure that a vehicle travelling a road has stability in the vehicle, the vehicle should avoid some spots on a surface of the road (hereinafter, also referred to as a "specific spot on a road") while travelling the road. A specific spot on a road is, for example, an uneven spot, a puddle and the like. When the vehicle travels on a road and has a tire thereof passing over such a specific spot on the road, the vehicle vibrates (experiences acceleration generated) in the vertical direction or experiences acceleration generated in a backward direction of the vehicle, which impairs stability in the vehicle.

In platooning, there may be an occupant not only in a leading vehicle but also in a following vehicle. When there is any such occupant, it is desired to travel a road while avoiding such a specific spot on the road to ensure stability in the vehicle to provide a comfortable space for the occupant. In addition, in platooning, vehicles may transport various types of luggage. Even when vehicles are loaded with various types of luggage, it is desired to travel a road while avoiding specific spots on the road to ensure stability in the vehicles to consider an effect on the loaded luggage.

The present disclosure has been made to solve the above-described problem, and an object of the present disclosure is to ensure stability in a vehicle during platooning.

(1) The presently disclosed vehicle is a vehicle allowing a plurality of such vehicles to travel in a platoon, the vehicle comprising: a communication device that bidirectionally communicates with a neighboring vehicle and receives, from a preceding vehicle traveling ahead in the platoon, road surface information of a surface of a road travelled by the preceding vehicle; and a control device that performs avoidance control to avoid a spot on the road when the preceding vehicle having passed over the spot on the road is detected based on the road surface information, the spot on the road providing (i) a change equal to or larger than a first threshold value to acceleration of the preceding vehicle as the preceding vehicle passes over the spot on the road, (ii) a change equal to or larger than a second threshold value to acceleration of a vehicular wheel of the preceding vehicle as the preceding vehicle passes over the spot on the road, or (iii) a change equal to or larger than a third threshold value to acceleration of a travelling motor of the preceding vehicle as the preceding vehicle passes over the spot on the road.

According to the above configuration, the vehicle receives, from the preceding vehicle, road surface information of a surface of a road travelled by the preceding vehicle. The road surface information includes, for example, information of the location of a spot on a road at which the preceding vehicle detects a change in vertical acceleration equal to or larger than a first threshold value, that is, a spot (a specific spot) on the road which should be avoided in travelling the road. Thus, when the road surface information is received from the preceding vehicle, the avoidance control can be performed to travel while avoiding the specific spot on the road. Traveling around the specific spot on the road ensures stability in the vehicle.

(2) In one embodiment, the vehicle further comprises a detection device that detects that the vehicle has passed over the spot on the road. When the detection device detects that the vehicle has passed over the spot on the road, the control device locates the spot on the road that the vehicle has passed over, based on an output received from the detection device, adds information of the spot on the road to the road surface information, and controls the communication device to transmit the road surface information to a vehicle traveling behind in the platoon.

Even when the avoidance control is performed based on road surface information received from a preceding vehicle, there is a possibility that a specific spot on a road may be unavoidable, since the information of the specific spot received from the preceding vehicle is a location detected as the preceding vehicle passes over the specific spot on the road, and for example if the specific spot on the road is a wide area, the vehicle of interest may be able to avoid a portion of the specific spot indicated by the preceding vehicle, however, the vehicle may pass over another portion of the specific spot on the road. In that case, information of the specific spot on the road passed over by the vehicle of interest is added to the road surface information received from the preceding vehicle, and transmitted to a following vehicle traveling behind the vehicle of interest in the platoon. The road surface information received by the following vehicle includes information of the specific spot on the road indicated by the preceding vehicle and information of the specific spot on the road indicated by the vehicle of interest. That is, the following vehicle can perform the avoidance control to avoid the specific spot on the road based on the two pieces of information. This can increase a possibility that the following vehicle can avoid the specific spot on the road.

(3) In one embodiment, the control device does not perform the avoidance control when a second parameter is larger than a first parameter. The first parameter indicates vertical acceleration or longitudinal acceleration generated as the vehicle passes over the spot on the road. The second parameter indicates lateral acceleration generated as the avoidance control is performed.

Performing the avoidance control to avoid a specific spot on a road may cause large lateral acceleration. When performing the avoidance control causes large lateral acceleration, performing the avoidance control may impair stability in the vehicle more than passing over the specific spot does. According to the above configuration, the avoidance control is not performed when the second parameter indicating lateral acceleration generated as the avoidance control is performed is larger than the first parameter indicating vertical or longitudinal acceleration. This can suppress a decrease in stability in the vehicle.

(4) In one embodiment, the control device does not perform the avoidance control when the lateral acceleration generated by the avoidance control exceeds a threshold value.

If performing the avoidance control is expected to cause lateral acceleration having a magnitude exceeding a threshold value, rapid steering may be performed. The above configuration can suppress a sense of fear felt by an occupant in the vehicle as rapid steering is performed.

(5) In one embodiment, the vehicle further comprises an in-vehicle device that captures an image in the vehicle and/or collects sound in the vehicle. The control device uses the captured image and/or sound to detect discomfort felt by an occupant in the vehicle. When the avoidance control is not performed and the vehicle passes over the spot on the road, and when the control device detects that the occupant feels discomfort, the control device corrects the first parameter to increase the first parameter. When the avoidance control is performed, and when the control device detects that the occupant feels discomfort, the control device corrects the second parameter to increase the second parameter.

If there is no significant difference in level between the lateral acceleration generated by performing the avoidance control and the vibration generated when passing over a specific spot on a road, which of the two is more uncomfortable depends on the occupant's sense. According to the above configuration, the control device uses an image and/or sound captured by an in-vehicle device to detect the occupant's discomfort when the avoidance control is performed or when the vehicle passes over the specific spot on the road.

Then, when the avoidance control is not performed and the vehicle passes over the specific spot on the road, and the control device detects that the occupant feels discomfort, the control device corrects the first parameter to increase it. That is, when the occupant shows discomfort in response to vibration or the like caused when the vehicle passes over the specific spot on the road, the control device corrects the first parameter to increase it to facilitate performing the avoidance control. In contrast, when the avoidance control is performed, and the control device detects that the occupant feels discomfort, the control device corrects the second parameter to increase it. That is, when the occupant shows discomfort in response to lateral acceleration generated as the avoidance control is performed, the second parameter is corrected to be increased so that the avoidance control is less likely to be performed. This allows the occupant's preference to be reflected in whether the avoidance control may be performed.

(6) In one embodiment, the vehicle further comprises a traveling motor and a battery as a power supply source for the traveling motor. When the battery has a voltage presenting a change exceeding a prescribed value applied for detecting occurrence of slip and grip, the control device identifies which drive wheel slips and grips, adds, to the road surface information, information of the spot on the road passed over by the drive wheel, and controls the communication device to transmit the road surface information to a vehicle traveling behind in the platoon.

If a drive wheel temporarily slips (idles) and subsequently again grips a road surface, i.e., slips and grips, a reaction force load is input to the traveling motor when the drive wheel grips the road surface. As a result, the battery voltage instantaneously rises. Therefore, when the battery voltage instantaneously rises, it is assumed that a slip and grip has occurred as any of the drive wheels has passed over a specific spot on a road.

By previously determining a prescribed value applied for detecting occurrence of slip and grip, which one of the drive wheels has passed over the specific spot on the road can be detected when the battery voltage presents a change exceeding the prescribed value. Then, for example, by identifying a drive wheel that has slipped and gripped based on a change in rotation speed of each drive wheel, where the specific spot on the road that the drive wheel of interest has passed over is located can be detected. And causing the information of the specific spot on the road to be included in the road surface information and thus transmitting it to a following vehicle can increase a possibility that the following vehicle can avoid the specific spot on the road.

(7) (8) In one embodiment, the vehicle further comprises a traveling motor and a battery as a power supply source for the traveling motor. When an amount of charge stored in the battery falls below a threshold amount of charge, the control device does not perform the avoidance control.

When the amount of charge stored in the battery falls below the threshold amount of charge, it may be desirable to prioritize suppressing power consumption rather than ensuring stability in the vehicle. When the avoidance control is performed in a vehicle the vehicle departs from the platoon, and air resistance decreased by the presence of a preceding vehicle increases. In order to maintain vehicular speed with air resistance increased, power consumption may increase. Accordingly, when the amount of charge stored in the battery falls below the threshold amount of charge, performing the avoidance control can be avoided to suppress power consumption.

(9) (10) In one embodiment, the vehicle further comprises a traveling motor, a battery as a power supply source for the traveling motor, and a temperature sensor to sense the battery's temperature. When the battery's temperature exceeds a threshold temperature, the control device does not perform the avoidance control.

When a vehicle traveling in a platoon excluding a leading vehicle is compared with a vehicle traveling alone, the former receives less air for cooling the battery. This is because the presence of a preceding vehicle reduces air resistance. Therefore, when a vehicle traveling in a platoon excluding a leading vehicle is compared with a vehicle traveling alone the former tends to have higher battery temperature than the latter. It is known that a battery deteriorates fast when it attains a prescribed temperature or higher.

When the vehicle traveling in the platoon performs the avoidance control, the vehicle departs from the platoon, and accordingly, the air resistance that has been reduced by the presence of the preceding vehicle increases, and more cooling air is received. The battery is thus easily cooled. In contrast, in order to maintain vehicular speed, the battery's output power may be increased to correspond to the increase in air resistance. It takes time to cool the battery with air, and when the avoidance control is performed, the battery's temperature may temporarily increase due to the increase of the output power, and may exceed a temperature which would deteriorate the battery. Accordingly, a threshold temperature is set so that when the avoidance control is performed the battery's temperature does not exceed the temperature which would deteriorate the battery, and the avoidance control is not performed when the battery's temperature exceeds the threshold temperature. This can suppress deterioration of the battery.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present disclosure will be described in detail hereinafter with reference to the drawings, in which identical or corresponding portions are identically denoted and will not be described repeatedly.

First Embodiment

<General Configuration>

Figure 1:
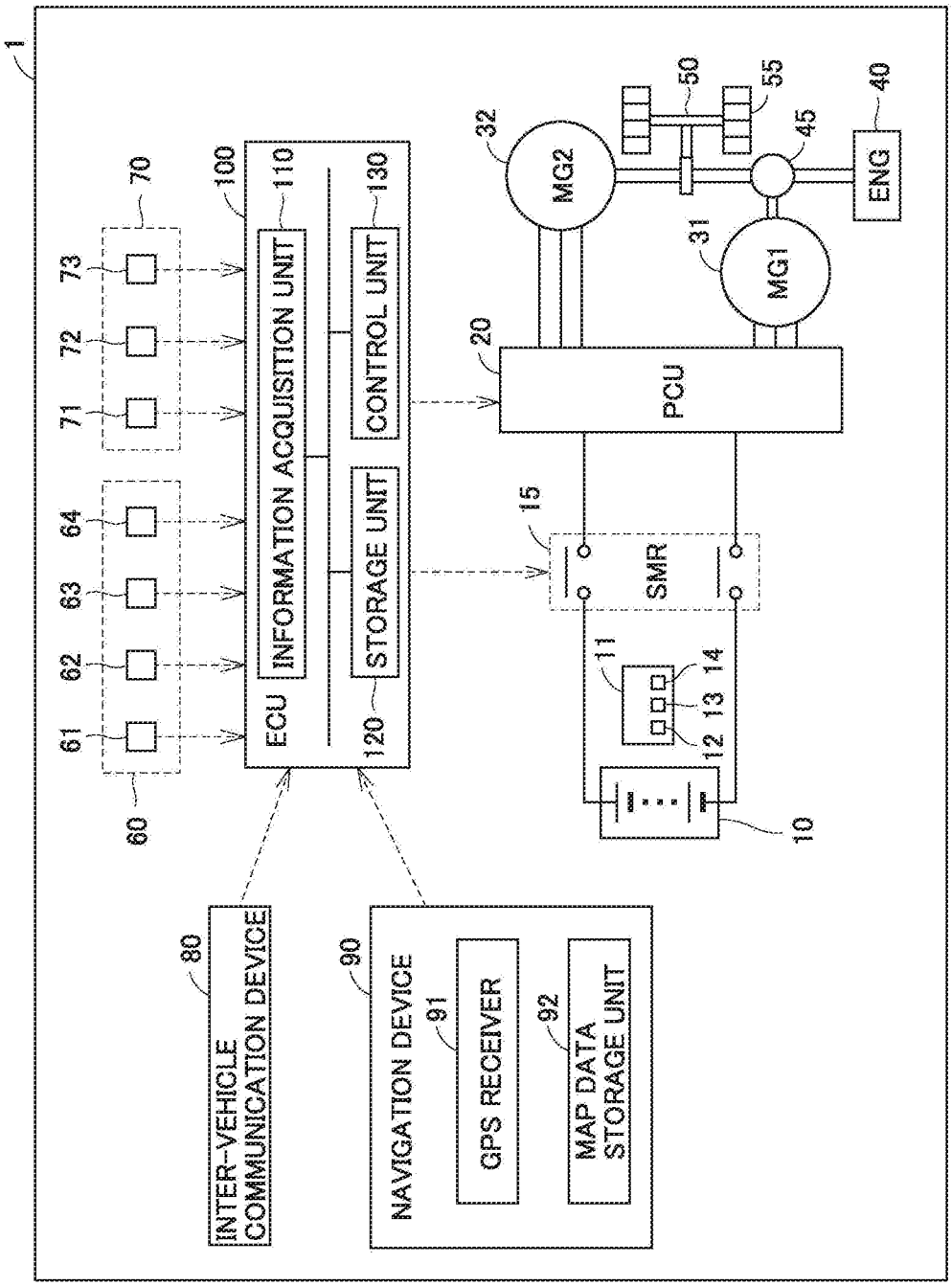
FIG. 1 is a block diagram for illustrating an example configuration of a vehicle according to a first embodiment.
Figure 2:
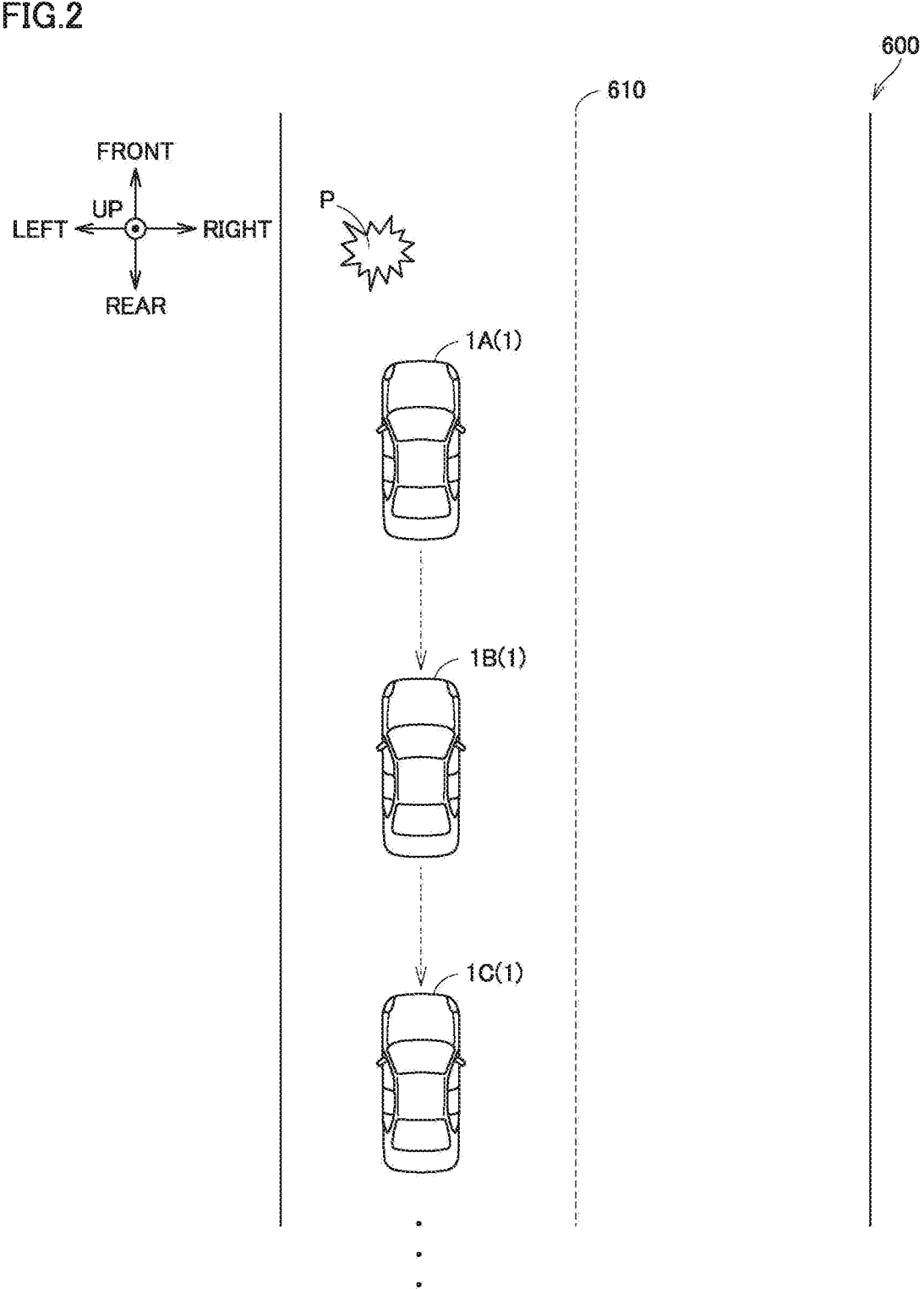
FIG. 2 is a diagram for illustrating an example of vehicle platooning.

A vehicle 1 according to the present embodiment will be described with reference to FIGS. 1 and 2. FIG. 1 is a block diagram for illustrating an example configuration of vehicle 1 according to the first embodiment. FIG. 2 is a diagram for illustrating an example of vehicle platooning. Vehicle 1 according to the first embodiment is a hybrid vehicle allowing a plurality of such vehicles to travel in a platoon. Vehicle 1 may be any vehicle capable of travelling in a platoon. For example, vehicle 1 may be an automobile using an internal combustion engine alone as a power source, or may be an electric automobile or a fuel cell automobile.

FIG. 2 shows a diagram in which a platoon is travelling on a left lane of a road 600 having two lanes on each side.

As shown in FIG. 2, the platoon is formed of a plurality of vehicles 1 (vehicles 1A, 1B, 1C, . . . ).

Vehicle 1A, which is the leading vehicle in the platoon, travels according to a driving operation of an occupant in the vehicle. That is, when vehicle 1 travels as the leading vehicle in a platoon, vehicle 1 travels according to a driving operation of an occupant in the vehicle. Vehicle 1A travelling as the leading vehicle in the platoon may be configured to travel toward a destination by automatic driving. Automatic driving means that vehicle 1 autonomously travels based on information received from various types of sensors and information from other vehicles without any occupant in vehicle 1 performing a driving operation. For example, in automatic driving, each actuator of vehicle 1 is controlled so that vehicle 1 autonomously travels on a traveling route selected based on various pieces of information.

Furthermore, in the platoon, vehicles 1B and 1C traveling behind vehicle 1A each travel following a preceding vehicle traveling ahead thereof. That is, when vehicle 1 does not travel as a leading vehicle in a platoon, vehicle 1 travels following a preceding vehicle in the platoon. When vehicle 1 travels following a preceding vehicle, vehicle 1 controls its vehicular speed so as to maintain a prescribed inter-vehicle distance from the preceding vehicle, and controls steering so as to follow the traveling locus of the preceding vehicle. In platooning, vehicles communicate information such as acceleration and deceleration with one another via an inter-vehicle communication device described hereinafter, and accordingly, the above-mentioned prescribed inter-vehicle distance can be set to be shorter than an inter-vehicle distance required when an occupant performs a driving operation.

With reference to FIG. 1, vehicle 1 includes a battery 10, a monitoring unit 11, a system main relay (hereinafter also referred to as "SMR") 15, a power control unit (hereinafter also referred to as "PCU") 20, motor generators (hereinafter also referred to as "MGs") 31 and 32, an engine 40, a power split device 45, a drive shaft 50, a drive wheel 55, and an ECU (electronic control unit) 100. Further, vehicle 1 includes an internal sensor group 60, an external sensor group 70, an inter-vehicle communication device 80, and a navigation device 90. Note that, as an example, vehicle 1 according to the first embodiment will be described as a front-wheel drive vehicle. That is, drive wheel 55 is a front wheel. Vehicle 1 may be a rear-wheel drive vehicle or an all-wheel drive vehicle.

Battery 10 is mounted on vehicle 1 as a driving power source (that is, a power source) for vehicle 1. Battery 10 includes a plurality of stacked batteries. Each battery is, for example, a secondary battery such as a nickel metal hydride battery or a lithium ion battery. Further, the battery may be a battery having a liquid electrolyte between a positive electrode and a negative electrode, or may be a battery having a solid electrolyte (i.e., an all-solid battery). Note that as battery 10 a rechargeable DC power supply suffices, and a large-capacity capacitor may also be employed.

Monitoring unit 11 monitors the state of battery 10. Specifically, monitoring unit 11 includes a voltage sensor 12 for sensing a voltage VB of battery 10, a current sensor 13 for sensing a current IB input to and output from battery 10, and a temperature sensor 14 for sensing the temperature TB of battery 10 (hereinafter also simply referred to as "battery temperature TB"). Each sensor outputs to ECU 100 a signal indicating its sensed result.

SMR 15 is electrically connected between PCU 20 and battery 10. When SMR 15 is in the closed state, battery 10 supplies power to PCU 20. When SMR 15 is in the open state, battery 10 does not supply power to PCU 20.

In response to a control signal from ECU 100, PCU 20 converts DC power stored in battery 10 into AC power and supplies the AC power to motor generators 31 and 32. Further, PCU 20 converts the AC power generated by motor generators 31 and 32 into DC power and supplies the DC power to battery 10. PCU 20 controls states of motor generators 31 and 32 individually. For example, PCU 20 can bring motor generator 32 into a power running state while bringing motor generator 31 into a regenerative state. PCU 20 includes, for example, two inverters provided to correspond to motor generators 31 and 32, and a converter that boosts a DC voltage that is supplied to each inverter to a voltage equal to or higher than voltage output from battery 10.

Each of motor generators 31 and 32 is an AC rotating electric machine, for example, a three-phase AC rotating electric machine with a permanent magnet embedded in a rotor (not shown). Motor generator 31 is connected to a crankshaft of engine 40 via power split device 45. Motor generator 31 rotates the crankshaft of engine 40 using the electric power of battery 10 when starting engine 40. Further, motor generator 31 can generate electric power using the power of engine 40. Motor generator 31 generates AC power, which is converted to DC power by PCU 20 and charged in battery 10. The AC power generated by motor generator 31 may also be supplied to motor generator 32 in some cases.

Motor generator 32 rotates drive shaft 50 using at least one of the electric power received from battery 10 and the electric power generated by motor generator 31. Further, motor generator 32 can also generate electric power by regenerative braking when applying brakes or reducing acceleration. Motor generator 32 generates AC power, which is converted to DC power by PCU 20 and charged in battery 10.

Engine 40 is, for example, an internal combustion engine such as a gasoline engine or a diesel engine. Engine 40 is controlled by a control signal issued from ECU 100.

Power split device 45 is, for example, a planetary gear mechanism having three rotation shafts of a sun gear, a carrier, and a ring gear, and splits power generated by engine 40 into power to be transmitted to drive wheel 55 and power to be transmitted to motor generator 31.

Internal sensor group 60 includes various types of sensors for sensing a state of an interior of vehicle 1 and sensing a state of traveling of vehicle 1. Specifically, internal sensor group 60 includes a vehicular speed sensor 61, an acceleration sensor 62, a gyro sensor 63, and a stroke sensor 64.

Vehicular speed sensor 61 is provided at a wheel or drive shaft 50 of vehicle 1 or the like. Vehicular speed sensor 61 senses, for example, the wheel's rotational speed and outputs vehicular speed information including the speed of vehicle 1 to ECU 100.

Acceleration sensor 62 includes, for example, a longitudinal acceleration sensor that senses acceleration of vehicle 1 in the longitudinal direction of vehicle 1 and a lateral acceleration sensor that senses acceleration of vehicle 1 in the lateral direction of vehicle 1. Acceleration sensor 62 outputs to ECU 100 acceleration information including both the longitudinal acceleration of vehicle 1 and the lateral acceleration of vehicle 1.

Gyro sensor 63 senses inclination of vehicle 1 from the horizontal direction. Specifically, gyro sensor 63 senses inclination of vehicle 1 in the longitudinal direction of the vehicle with respect to the horizontal direction and inclination of vehicle 1 in the lateral direction of the vehicle with respect to the horizontal direction. Gyro sensor 63 outputs its sensed result to ECU 100 as information of inclination of vehicle 1.

Stroke sensor 64 is provided for each wheel, and senses an amount by which a suspension that supports the wheel strokes. Stroke sensor 64 outputs its sensed result to ECU 100 as displacement information. ECU 100 receives the displacement information and calculates an amount of vertical displacement of each wheel based on the displacement information.

External sensor group 70 includes various types of sensors to sense a state outside of vehicle 1. Specifically, external sensor group 70 includes a camera 71, a radar 72, and a lidar (Laser Imaging Detection and Ranging) 73.

Camera 71 captures an image of a state outside of vehicle 1 and outputs captured image information for the state outside of vehicle 1 to ECU 100. The captured image information for the state outside of the vehicle includes, for example, information of other neighboring, travelling vehicles, lanes and the like.

Radar 72 transmits a radio wave (for example, a millimeter wave) around vehicle 1 and receives a radio wave reflected by an obstacle to detect the obstacle. Radar 72 outputs, for example, the distance to the obstacle and the direction of the obstacle to ECU 100 as obstacle information for the obstacle.

Lidar 73 transmits light (typically, ultraviolet ray, visible light, or near-infrared ray) around vehicle 1, receives light reflected by an obstacle and therefrom measures the distance to the reflection point to detect the obstacle. Lidar 73 outputs, for example, the distance to the obstacle and the direction of the obstacle to ECU 100 as obstacle information.

Inter-vehicle communication device 80 is configured to be able to perform bidirectional wireless communication with other vehicles around the vehicle of interest. Inter-vehicle communication device 80 can transmit travelling information, such as starting, stopping, accelerating, and decelerating vehicle 1, to another vehicle in response to a control signal issued from ECU 100. In addition, inter-vehicle communication device 80 can receive traveling information from another vehicle. In the inter-vehicle communication according to the first embodiment, traveling information is transmitted periodically as prescribed for control from a vehicle traveling ahead to a vehicle traveling behind. Furthermore, in the inter-vehicle communication according to the first embodiment, in addition to the traveling information, road surface information, which will be described hereinafter, is transmitted from a vehicle traveling ahead to a vehicle traveling behind.

Navigation device 90 includes a GPS (Global Positioning System) receiver 91 that specifies the current location of vehicle 1 based on radio waves from an artificial satellite, and a map data storage unit 92 that stores map data. Navigation device 90 performs various types of navigation processes for vehicle 1 using information of the current location of vehicle 1 as specified by GPS receiver 91 (i.e., GPS information). More specifically, navigation device 90 calculates a traveling route from the current location of vehicle 1 to a destination based on the GPS information of vehicle 1 and road map data stored in map data storage unit 92, and outputs information of the calculated travelling route to ECU 100. The function of navigation device 90 is used, for example, when a vehicle travels as a leading vehicle in a platoon.

ECU 100 receives a signal from each sensor or the like, outputs a control signal to each device, and controls each device. These controls are not limited to processing by software, and can be constructed and processed by dedicated hardware (electronic circuitry).

ECU 100 includes an information acquisition unit 110, a storage unit 120, and a control unit 130. Information acquisition unit 110 acquires a sensed result (various types of information) from each sensor included in internal sensor group 60 and external sensor group 70. Information acquisition unit 110 also acquires various types of information from another vehicle via inter-vehicle communication device 80.

Storage unit 120 includes, for example, a ROM (Read Only Memory) and a RAM (Random Access Memory), and stores a program and the like executed by ECU 100. Note that storage unit 120 can be separately provided outside ECU 100.

Control unit 130 expands a program that is stored in the ROM into the RAM and executes the program. Control unit 130 controls each actuator of vehicle 1 based on various types of information received from internal sensor group 60 and external sensor group 70, information of a traveling route as received from navigation device 90, information from a preceding vehicle as acquired through inter-vehicle communication, and the like.

<Avoidance Control>

A road can have a surface with some spots (a specific spot) that a vehicle travelling the road should avoid. A specific spot on a road is, for example, an uneven spot, a puddle and the like. When a vehicle travels on a road and has a tire thereof passing over such a specific spot on the road, the vehicle vibrates in the vertical direction or experiences acceleration generated in a backward direction of the vehicle. That is, when the tire passes over the specific spot on the road, stability in the vehicle may be impaired.

In vehicle platooning, there may be an occupant not only in the leading vehicle 1A but also in following vehicles 1B and 1C. When there is such an occupant, it is desired to travel a road while avoiding such a specific spot on the road to ensure stability in the vehicles to provide a comfortable space for the occupant. In addition, in platooning, vehicles may transport various types of luggage. Even when the following vehicles 1B and 1C are loaded with various types of luggage, it is desired to travel a road while avoiding such a specific spot on the road to ensure stability in the vehicles to consider an effect on the loaded luggage.

Accordingly, vehicle 1 according to the first embodiment transmits road surface information to a following vehicle via inter-vehicle communication device 80. The road surface information includes, for example, information of the location of a specific spot on a road detected by the vehicle of interest. The following vehicle receives the road surface information from the preceding vehicle, and performs avoidance control to avoid the specific spot on the road based on the information of the location of the specific spot on the road included in the road surface information.

Figure 3:
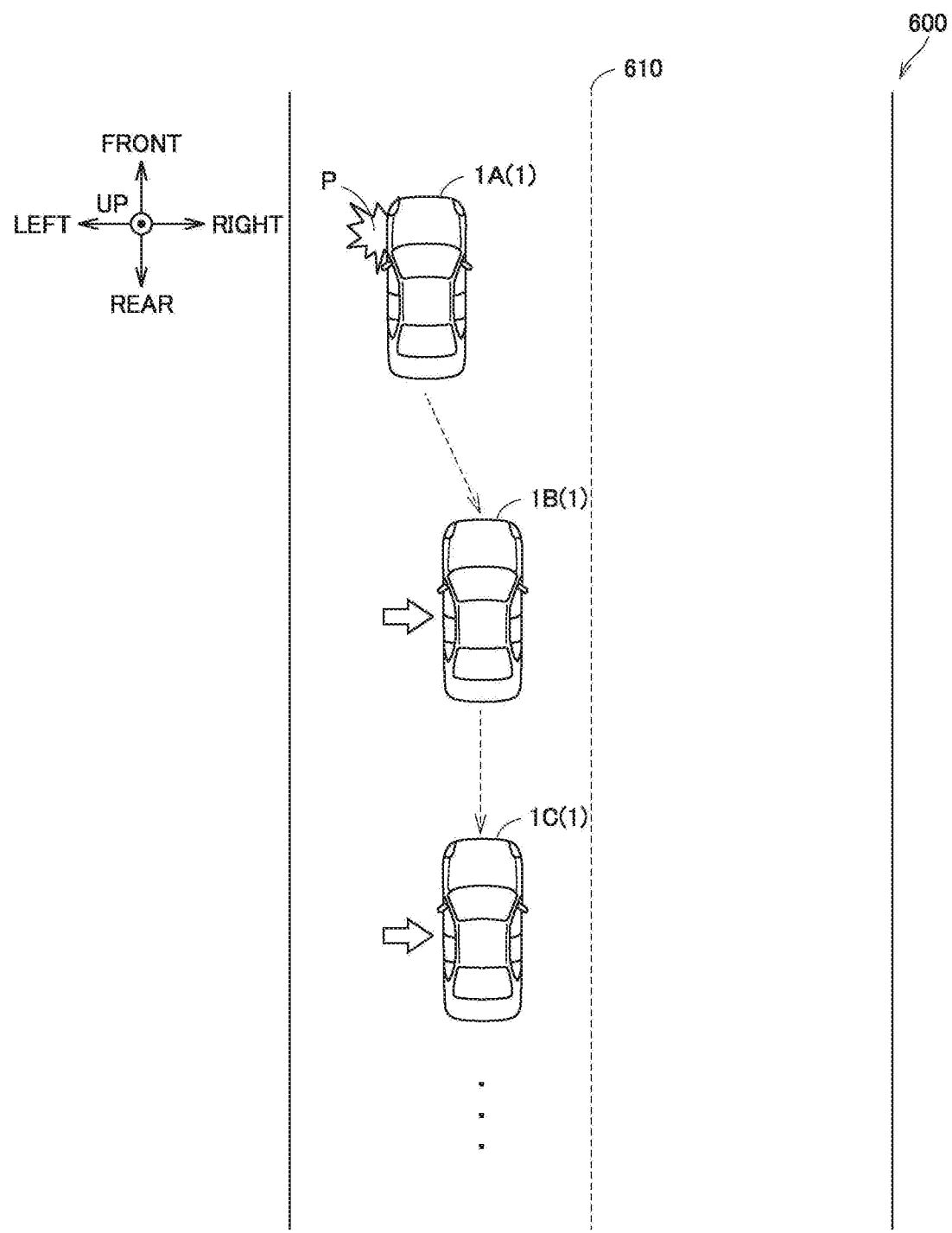
FIG. 3 is a diagram for illustrating avoidance control.

This will be specifically described with reference to FIGS. 2 and 3. FIG. 3 is a diagram for illustrating the avoidance control. With reference to FIGS. 2 and 3, it is assumed that road 600 has a specific spot P on a left lane thereof. And it is assumed that a wheel (specifically, a left front wheel) of vehicle 1A travelling at the top of the platoon has passed over the specific spot P.

When the left front wheel of vehicle 1A has passed over the specific spot P, ECU 100 of vehicle 1A detects that the vehicle has passed over the specific spot P. Specifically, for example, when the specific spot P is an uneven spot, and the left front wheel of vehicle 1A passes over the specific spot P, an amount of vertical displacement of the left front wheel increases. When ECU 100 detects that the amount of vertical displacement of the left front wheel exceeds a threshold amount of displacement (a first threshold value), ECU 100 detects that the left front wheel has passed over the specific spot P. Then, for example based on information of where vehicle 1A was located when ECU 100 detected that the vehicle passed over the specific spot P, as specified by navigation device 90, and specification data of the vehicle of interest, ECU 100 calculates information of where the left front wheel was located when it passed over the specific spot P. Information of the location of the specific spot P can thus be obtained. Vehicle 1A causes the location information to be included in the road surface information and thus transmits the road surface information to vehicle 1B. Further, ECU 100 may use inclination information sensed by gyro sensor 63 to detect that the left front wheel has passed over the specific spot P. When gyro sensor 63 is used, ECU 100 can detect that the left front wheel has passed over the specific spot P, based on inclination of vehicle 1A in the longitudinal direction of the vehicle with respect to the horizontal direction and inclination of vehicle 1A in the lateral direction of the vehicle with respect to the horizontal direction. Furthermore, ECU 100 may use information sensed by a vertical acceleration sensor described hereinafter (see FIG. 7) to detect that the left front wheel has passed over the specific spot P.

Note that information for a specific spot on a road may be a relative location as viewed from the following vehicle 1B. Specifically, when vehicle 1A detects that vehicle 1A has passed over a specific spot on a road, vehicle 1A uses the platoon's vehicular speed and a prescribed inter-vehicle distance to calculate when vehicle 1B would pass over the specific spot or how much distance would be travelled by vehicle 1B to pass over the specific spot. Further, by detecting which one of the left and right front wheels of vehicle 1A has passed over the specific spot, a direction that vehicle 1B should avoid in the avoidance control (i.e., a steering direction) can be determined. Specifically, when the left front wheel of vehicle 1A passes over the specific spot, it can be expected that the left front wheel of vehicle 1B will also pass over the specific spot if vehicle 1B just continues to travel, and it can be determined that vehicle 1B should travel rightward for avoidance. In summary, vehicle 1A can calculate when vehicle 1B performs the avoidance control and which direction should be avoided by the avoidance control. Vehicle 1A causes information indicating when vehicle 1B performs the avoidance control and which direction should be avoided by the avoidance control to be included in road surface information, and transmits the road surface information to vehicle 1B. Note that the following will be described with the road surface information including information of the location of the specific spot P by way of example.

In addition, for example, when the specific spot P is a puddle, and the left front wheel of vehicle 1A passes over the specific spot P, the left front wheel will be in a state in which it is braked. In that case, passage of a wheel of vehicle 1A over the specific spot P and the wheel that has passed over the specific spot P can be detected based on each wheel's rotation speed sensed by vehicular speed sensor 61. For example, when braking is not controlled, passage of the left front wheel over the specific spot P can be detected by sensing that the left front wheel's rotation speed decreases. In other words, when braking is not controlled, passage of the left front wheel over the specific spot P can be detected by sensing that the left front wheel's acceleration (more specifically, deceleration) varies in an amount equal to or larger than a threshold amount (a second threshold value).

Then, for example based on information of where vehicle 1A was located when the vehicle passed over the specific spot P, as specified by navigation device 90, and specification data of the vehicle of interest, ECU 100 calculates information of where the left front wheel was located when it passed over the specific spot P. Information of the location of the specific spot P can thus be obtained. Alternatively, passage of a wheel of vehicle 1A over the specific spot P and the wheel that has passed over the specific spot P may be detected based on acceleration information sensed by acceleration sensor 62. For example, a manner in which longitudinal acceleration and lateral acceleration change when the front left wheel is braked, a manner in which longitudinal acceleration and lateral acceleration change when the right front wheel is braked, a manner in which longitudinal acceleration and lateral acceleration change when the front right and left wheels are braked, and the like are previously simulated and stored in storage unit 120. When braking is not controlled, and any of the manners is detected from the acceleration information, passage of a wheel over the specific spot P and the wheel that has passed over the specific spot P can be detected.

Vehicular speed sensor 61, stroke sensor 64, gyro sensor 63, or acceleration sensor 62 corresponds to an example of a "detection device" according to the present disclosure.

When vehicle 1A obtains the information of the location of the specific spot P, vehicle 1A causes the information of the location of the specific spot P to be included in the road surface information and transmits the road surface information to the following vehicle 1B. Other than the information of the location of the specific spot P, the road surface information may include information of the type of the specific spot P, e.g., information indicating that the specific spot P is an uneven spot, a puddle or the like. The road surface information is transmitted to the following vehicle 1B, together with the traveling information transmitted through inter-vehicle communication periodicity as prescribed for control, when passage over the specific spot P is detected, for example. Alternatively, the road surface information may be transmitted to the following vehicle 1B separately from the travelling information when passage over the specific spot P is detected.

When vehicle 1B receives the road surface information from vehicle 1A, vehicle 1B transmits to the following vehicle 1C the road surface information received from vehicle 1A, and also performs the avoidance control. Thus, as shown in FIG. 3, vehicle 1B and vehicle 1C perform the avoidance control to change their traveling positions to temporarily travel closer to a lane boundary line 610 to avoid the location of the specific spot P specified by the location information. Passing over the specific spot P can thus be avoided.

Figure 4:
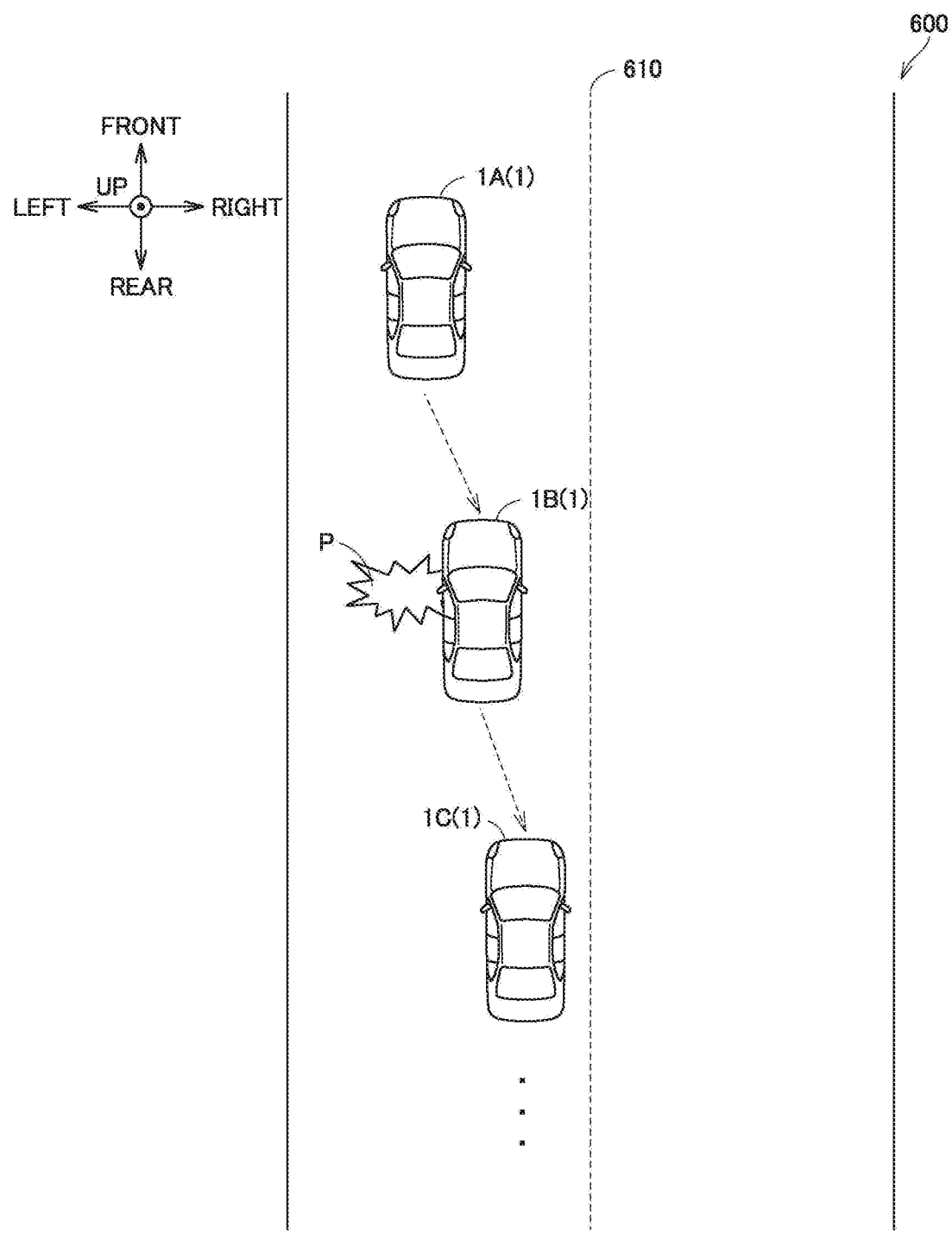
FIG. 4 is a diagram for illustrating an improvement in accuracy in avoiding a specific spot on a road.

FIG. 4 is a diagram for illustrating an improvement in accuracy in avoiding the specific spot P. When vehicle 1B, which has performed the avoidance control based on the road surface information received from vehicle 1A, has successfully avoided the specific spot P by performing the avoidance control (that is, when passage over the specific spot P is not detected), then, for the subsequent period prescribed for control, the road surface information is not transmitted to vehicle 1C. This is because vehicle 1C can avoid the specific spot P by performing the avoidance control based on the road surface information that vehicle 1C has received from vehicle 1A.

In contrast, vehicle 1B having performed the avoidance control based on the road surface information received from vehicle 1A may have failed to avoid the specific spot P. The road surface information received from vehicle 1A only includes information of the location of a spot on a road passed over by the left front wheel of vehicle 1A. Therefore, for example, as shown in FIG. 4, even if the specific spot P does not have a size across both front wheels of vehicle 1A, but is wide to some extent, the left front wheel of vehicle 1B may pass over the specific spot P on the road even though vehicle 1B has performed the avoidance control.

In the above case, vehicle 1B, as well as vehicle 1A, uses information of where vehicle 1B was located when the vehicle passed over the specific spot P on the road and specification data of the vehicle of interest to calculate information of where the left front wheel was located when it passed over the specific spot P. And vehicle 1B obtains information of the location of the specific spot P passed over. Vehicle 1B adds the information of the location to the road surface information received from vehicle 1A, and thus updates the road surface information. Vehicle 1B transmits the updated road surface information to vehicle 1C.

Vehicle 1C performs the avoidance control so as to avoid where vehicle 1A and vehicle 1B have passed. A possibility that vehicle 1C can avoid passing over the specific spot P can thus be increased. That is, in the platoon formed by vehicles 1 according to the first embodiment, a vehicle farther behind the leading vehicle can increase a possibility that it can avoid the specific spot P.

<Process Performed by ECU>

Figure 5:
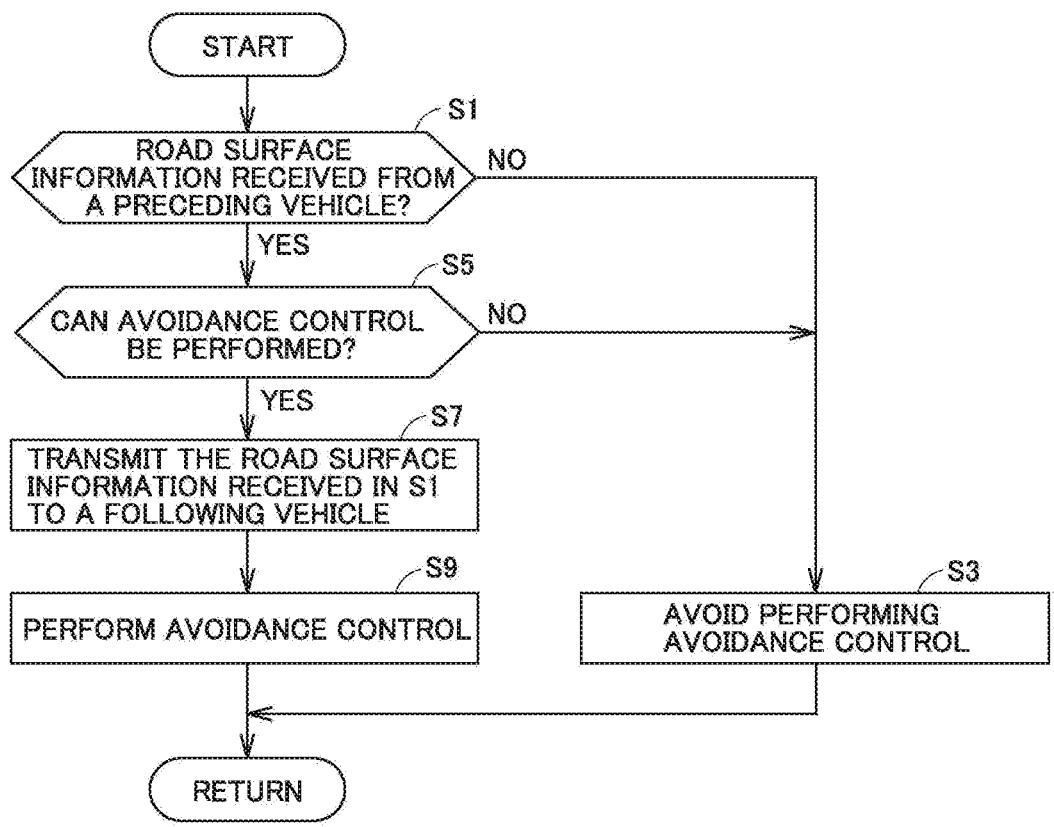
FIG. 5 is a flowchart of a process performed by an ECU of the vehicle according to the first embodiment.

FIG. 5 is a flowchart of a process performed by ECU 100 of vehicle 1 according to the first embodiment. The process of the flowchart starts whenever traveling information is received from a preceding vehicle periodically as prescribed for control. While each step of the processes in the flowcharts shown in FIG. 5, and FIGS. 6, 10 to 13, 15 and 17 described hereinafter will be described as being implemented by software processing performed by ECU 100, it may be partially or entirely implemented by hardware (electric circuitry) fabricated in ECU 100.

Upon receiving the traveling information from the preceding vehicle, ECU 100 determines whether road surface information has been received together with the traveling information (Step (hereinafter, abbreviated as "S") 1). When the road surface information has not been received (NO in S1), ECU 100 ends the process without performing the avoidance control (S3).

When the road surface information is received (YES in S1), ECU 100 determines whether a specific spot on a road included in the road surface information can be avoided (S5). That is, ECU 100 determines whether the avoidance control can be performed. More specifically, depending on the location of the specific spot on the road or the width of the road, the vehicle's body may get over into an adjacent lane across a lane boundary line in order to avoid the specific spot on the road. In the adjacent lane, there may be another vehicle travelling that does not form the platoon. Accordingly, ECU 100 determines whether the avoidance control can be performed based on a result of sensing by external sensor group 70. That is, ECU 100 determines whether performing the avoidance control affects the traveling of the other vehicle that does not form the platoon.

When it is determined that the avoidance control can be performed (YES in S5), ECU 100 transmits the road surface information received from the preceding vehicle to a following vehicle (S7), and performs the avoidance control to avoid the specific spot on the road (S9). In the avoidance control, when ECU 100 determines based on a result of sensing by external sensor group 70 that the vehicle can change a lane, the vehicle may do so temporarily to avoid the specific spot on the road.

In contrast, when it is determined that the avoidance control cannot be performed (NO in S5), ECU 100 ends the process without performing the avoidance control (S3). In that case, vehicle 1 passes over the specific spot on the road.

Figure 6:
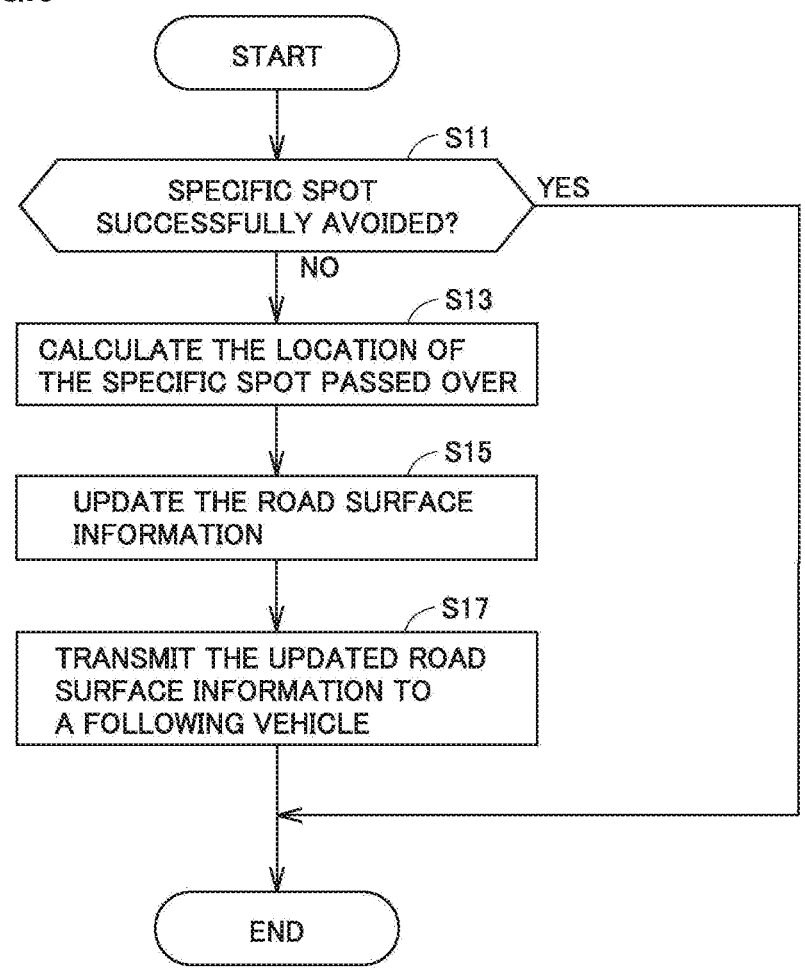
FIG. 6 is a flowchart of a process performed by the ECU after the avoidance control is performed.

FIG. 6 is a flowchart of a process performed by ECU 100 after the avoidance control is performed. ECU 100 determines whether the specific spot on the road has successfully been avoided by performing the avoidance control (S11).

When the specific spot on the road has successfully been avoided by performing the avoidance control (YES in S11), ECU 100 ends the process.

When the specific spot on the road has not been avoided by performing the avoidance control (NO in S11), ECU 100 calculates information of the location of the specific spot on the road that the vehicle of interest has passed over (S13). Then, ECU 100 adds the calculated information of the location of the specific spot on the road to the road surface information obtained from the preceding vehicle to update the road surface information (S15).

ECU 100 transmits the updated road surface information to a following vehicle (S17). The following vehicle performs the avoidance control based on the received road surface information, and a possibility that the following vehicle can avoid the specific spot on the road can be increased.

Thus, vehicle 1 according to the first embodiment is configured to be capable of receiving road surface information including information of the location of a specific spot on a road from a preceding vehicle. And vehicle 1 is configured to perform the avoidance control for avoiding the specific spot based on the information of the location of the specific spot included in the road surface information received from the preceding vehicle. By performing the avoidance control, a possibility that the vehicle can travel while avoiding the specific spot on the road can be increased, and stability in the vehicle can be ensured.

Further, in performing the avoidance control, vehicle 1 determines whether the avoidance control can be performed based on a result of sensing by external sensor group 70. When it is determined that the avoidance control can be performed, vehicle 1 performs the avoidance control. This can prevent performing the avoidance control from affecting the traveling of another vehicle that does not form the platoon.

Furthermore, when vehicle 1 has performed the avoidance control and despite that could not avoid the specific spot on the road, vehicle 1 detects the location of the specific spot that the vehicle per se has passed over. Then, the information of the location of the specific spot on the road as detected is added to the road surface information received from the preceding vehicle to update the road surface information. The updated road surface information includes the information of the location of the specific spot on the road as indicated by the preceding vehicle and the information of the location of the specific spot on the road that the vehicle of interest has detected. Vehicle 1 transmits the updated road surface information to a following vehicle. The following vehicle receives the updated road surface information and performs the avoidance control based on the updated road surface information. Thus performing the avoidance control can increase a possibility that the following vehicle can avoid the specific spot on the road.

(First Modification)

When vehicle 1 according to the first embodiment detects that the vehicle has passed over a specific spot on a road, vehicle 1 transmits road surface information including information of the location of the specific spot on the road detected by the vehicle per se to a following vehicle. In a first modification will be described an example in which whether a preceding vehicle has passed over a specific spot on a road is detected by a following vehicle.

Specifically, vehicle 1 according to the first modification periodically as prescribed causes a result of sensing by internal sensor group 60 and location information of vehicle 1 obtained when internal sensor group 60 sensed the result to be included in road surface information, and transmits the road surface information to a following vehicle. That is, vehicle 1 causes a result of sensing by internal sensor group 60 and location information of vehicle 1 obtained when internal sensor group 60 sensed the result to be included in road surface information. When the result of sensing by internal sensor group 60 is, for example, displacement information representing a result of sensing by stroke sensor 64, it takes a form capable of specifying an amount of stroking and which wheel is supported by a suspension stroking in that amount.

The following vehicle receives the road surface information and detects whether the preceding vehicle has passed over a specific spot based on a result of sensing by internal sensor group 60 included in the road surface information. For example, the following vehicle calculates an amount of vertical displacement of each wheel based on displacement information that is a result of sensing by internal sensor group 60. And, as an example, when the left front wheel's vertical displacement as calculated is larger than a threshold amount of displacement, the following vehicle detects that the left front wheel of the preceding vehicle has passed over an uneven spot (a specific spot) on the road. And the following vehicle calculates the location of the uneven spot for example from the preceding vehicle's specification data and the location information included in the road surface information. The preceding vehicle's specification data may be transmitted from the preceding vehicle to the following vehicle when the vehicles start to travel in a platoon, for example. And the following vehicle performs the avoidance control so as to avoid the calculated uneven spot.

Thus, allowing a following vehicle to detect whether a preceding vehicle has passed over a specific spot on a road can also increase a possibility of being able to travel around the specific spot on the road, and hence ensures stability in the vehicle, as well as in the first embodiment.

Further, vehicle 1 according to the first modification may cause a result of sensing by internal sensor group 60 of the vehicle per se alone and location information of vehicle 1 that is obtained when internal sensor group 60 obtains the result to be included in road surface information, and may transmit the information to a following vehicle, or may add a result of sensing by internal sensor group 60 of the vehicle per se and location information of vehicle 1 that is obtained when internal sensor group 60 obtains the result to road surface information received from a preceding vehicle, and may transmit updated road surface information to a following vehicle. In any case, as well as in the first embodiment, a vehicle farther behind a leading vehicle in a platoon can increase a possibility that it can avoid a specific spot on a road.

Second Embodiment

Vehicle 1 according to the first embodiment performs the avoidance control when the vehicle receives road surface information from a preceding vehicle. However, performing the avoidance control may cause relatively large lateral acceleration to vehicle 1. When performing the avoidance control causes relatively large lateral acceleration, performing the avoidance control may impair stability in the vehicle more than passing over a specific spot on a road without avoiding it does. Accordingly, in a second embodiment, an example will be described in which performing the avoidance control or passing over a specific spot on a road without performing the avoidance control is selected.

In the second embodiment, it is assumed that the specific spot is an uneven spot. That is, when a vehicle 2 (see FIG. 7) passes over the specific spot, vehicle 2 experiences vertical vibration. Furthermore, in the second embodiment, it is assumed that there is an occupant in vehicle 2. In the second embodiment, whether performing the avoidance control or passing over the specific spot on the road without performing the avoidance control is selected is determined based on which one of the lateral acceleration generated by performing the avoidance control and the vertical vibration caused by passing over the specific spot on the road is uncomfortable for the occupant. That is, whether the avoidance control may be performed is determined based on which one of the lateral acceleration and the vertical vibration is felt by the occupant as more uncomfortably impairing stability in the vehicle. For example, when vehicle 2 is loaded with luggage rather than an occupant, whether to perform the avoidance control or pass over the specific spot on the road may be selected depending on the type or the like of the loaded luggage.

Figure 7:
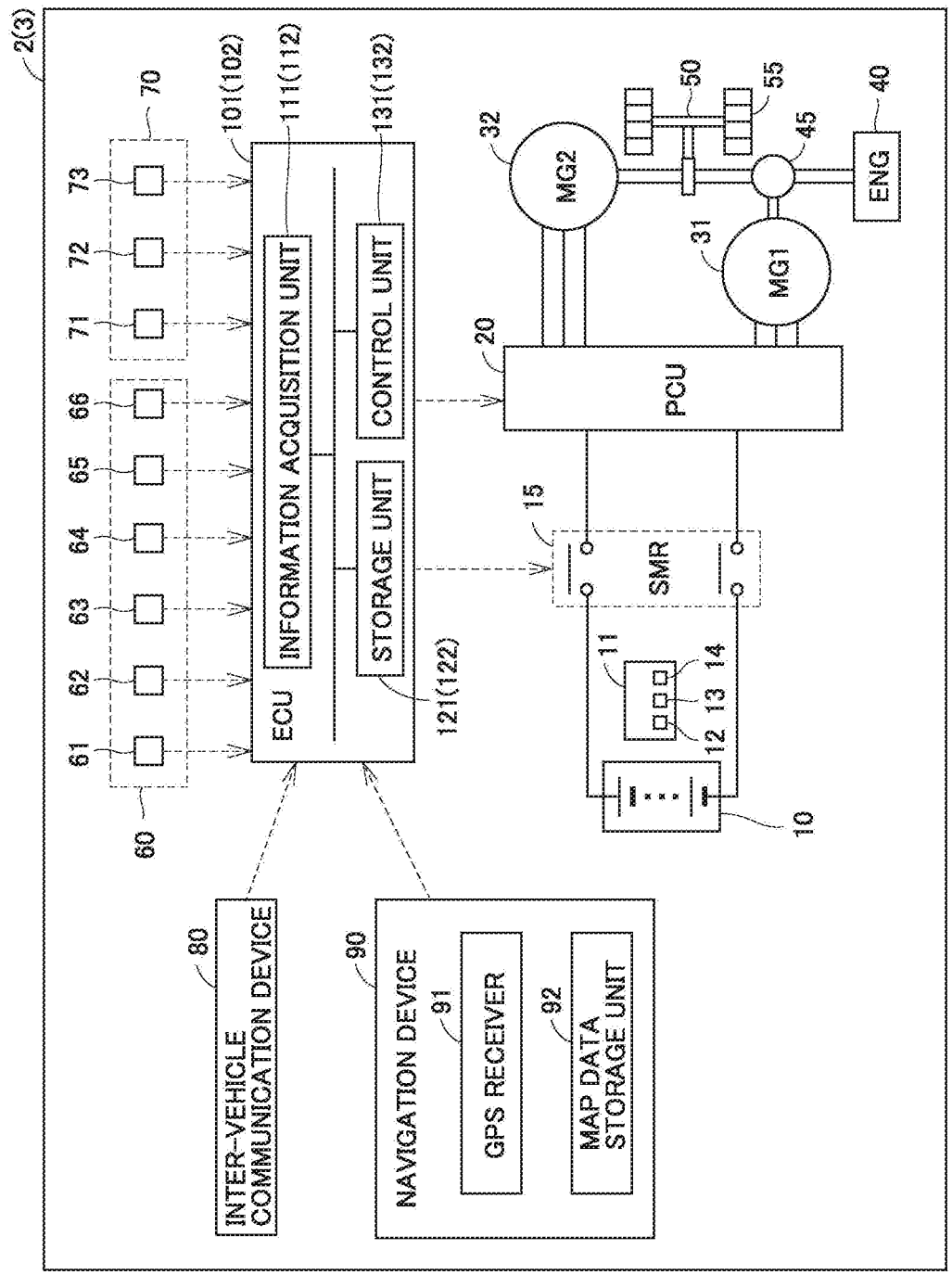
FIG. 7 is a block diagram for illustrating an example configuration of a vehicle according to a second embodiment.

FIG. 7 is a block diagram for illustrating an example configuration of vehicle 2 according to the second embodiment. Vehicle 2 according to the second embodiment is the same as the first embodiment except for an ECU 101, a vertical acceleration sensor 65, and an in-vehicle camera 66, and will not be described repeatedly. Note that in-vehicle camera 66 will be described in a second modification described hereinafter. That is, in the second embodiment, in-vehicle camera 66 is not an essential component.

According to the second embodiment, road surface information includes, in addition to information of the location of a specific spot on a road, information indicating the magnitude of vertical vibration generated by passing over the specific spot on the road. An information acquisition unit 111 of ECU 101 obtains road surface information from a preceding vehicle via inter-vehicle communication device 80. A storage unit 121 of ECU 101 stores a first map for converting vertical vibration into an occupant's discomfort index, and a second map for converting lateral acceleration into the occupant's discomfort index. A control unit 131 of ECU 101 performs various types of computations using, for example, the road surface information, the first map, the second map, and the like. Control unit 131 detects, for example, the magnitude of vertical vibration caused when passing over the specific spot on the road, adds information of the location of the specific spot on the road and information indicating the magnitude of the vertical vibration to the road surface information, and transmits the information to a following vehicle.

Vertical acceleration sensor 65 is used to detect the magnitude of the vertical vibration caused when passing over the specific spot on the road. Vertical acceleration sensor 65 is provided for each wheel and senses vertical vibration of each wheel for example. Vertical acceleration sensor 65 outputs a sensed result to ECU 101. Note that sensing the magnitude of the vertical vibration caused when passing over the specific spot on the road may be done using an amount of vertical displacement of a wheel calculated based on a result of sensing by stroke sensor 64.

Figure 8:
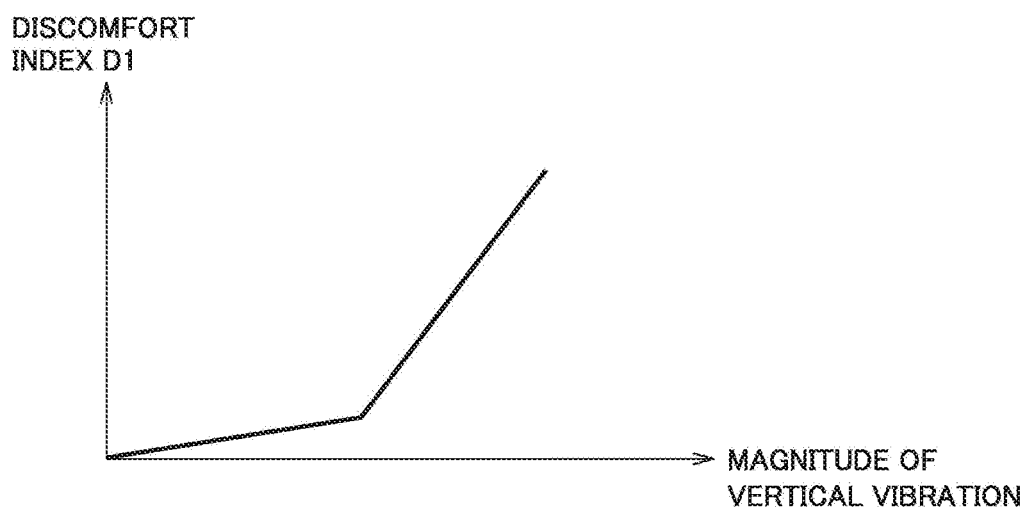
FIG. 8 is a diagram for illustrating a first map.
Figure 9:
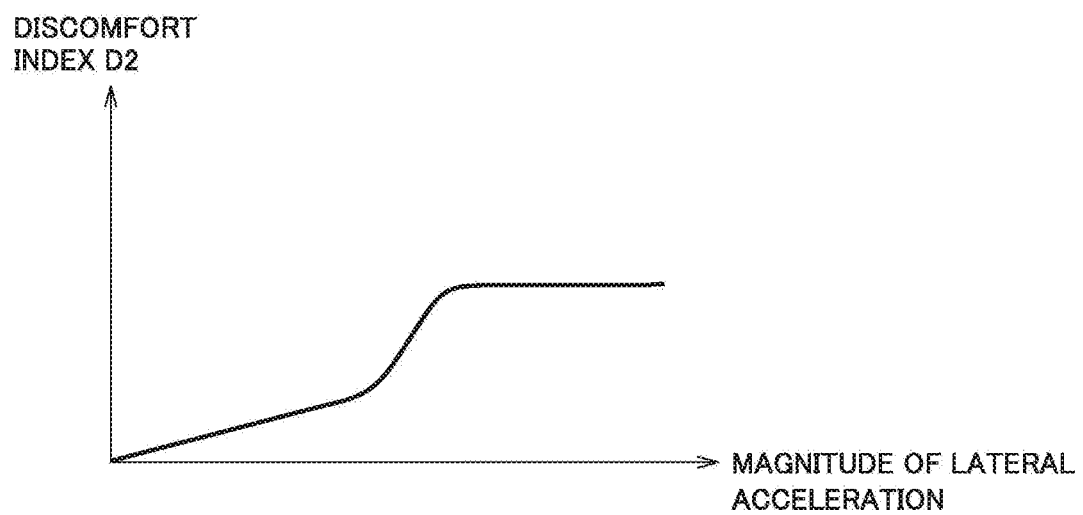
FIG. 9 is a diagram for illustrating a second map.

FIG. 8 is a diagram for illustrating the first map. FIG. 9 is a diagram for illustrating the second map. In FIG. 8, the horizontal axis represents vertical vibration in magnitude, and the vertical axis represents an occupant's discomfort index D1. In FIG. 9, the horizontal axis represents lateral acceleration in magnitude, and the vertical axis represents the occupant's discomfort index D2. The first map and the second map are determined in advance through an experiment, statistically or the like, and stored in storage unit 121.

ECU 101 compares information indicating the magnitude of the vertical vibration included in the road surface information received from a preceding vehicle with the first map to convert the magnitude of the vertical vibration expected to be generated by passing over the specific spot on the road into the occupant's discomfort index D1. ECU 101 compares the magnitude of the lateral acceleration expected to be generated by performing the avoidance control with the second map to convert the magnitude of the lateral acceleration expected to be generated by performing the avoidance control into the occupant's discomfort index D2.

ECU 101 compares discomfort indices D1 and D2, and determines whether to perform the avoidance control according to the relationship in magnitude between the discomfort indices D1 and D2. Specifically, when the discomfort index D1 is larger than the discomfort index D2 (D1>D2), the occupant feels more discomfort with the vertical vibration, and accordingly, the avoidance control is performed to avoid the specific spot on the road. In contrast, when the discomfort index D1 is equal to or smaller than the discomfort index D2 (D1≤D2), the occupant feels more discomfort with the lateral acceleration, and accordingly, the vehicle passes over the specific spot without performing the avoidance control.

Note that ECU 101 may compare a value sensed by vertical acceleration sensor 65 when a preceding vehicle passes over the specific spot on the road, that is, the magnitude of vertical acceleration, with the magnitude of lateral acceleration expected to be generated by performing the avoidance control. When the specific spot on the road is a puddle, ECU 101 may compare a value sensed by acceleration sensor 62 when a preceding vehicle passes over the specific spot on the road, that is, the magnitude of longitudinal acceleration, with the magnitude of the lateral acceleration expected to be generated by performing the avoidance control. The discomfort index D1, the magnitude of the vertical acceleration, or the magnitude of the longitudinal acceleration corresponds to an example of a "first parameter" according to the present disclosure. The discomfort index D2 or the magnitude of the lateral acceleration corresponds to an example of a "second parameter" according to the present disclosure.

Further, when vehicle 2 is loaded with luggage, it is possible to prepare a third map (not shown) for converting vertical vibration into an amount of damage to the luggage and a fourth map (not shown) for converting lateral acceleration into an amount of damage to the luggage. In that case, ECU 101 compares the information indicating the magnitude of the vertical vibration included in the road surface information received from a preceding vehicle with the third map to convert the magnitude of the vertical vibration expected to be generated by passing over the specific spot on the road into an amount of damage to the luggage. Further, ECU 101 compares the magnitude of the lateral acceleration expected to be generated by performing the avoidance control with the fourth map to convert the magnitude of the lateral acceleration expected to be generated by performing the avoidance control into an amount of damage to the luggage. And ECU 101 compares the amounts of the damages to determine whether to perform the avoidance control according to the relationship in magnitude of the amounts of the damages.

<Process Performed by ECU>

Figure 10:
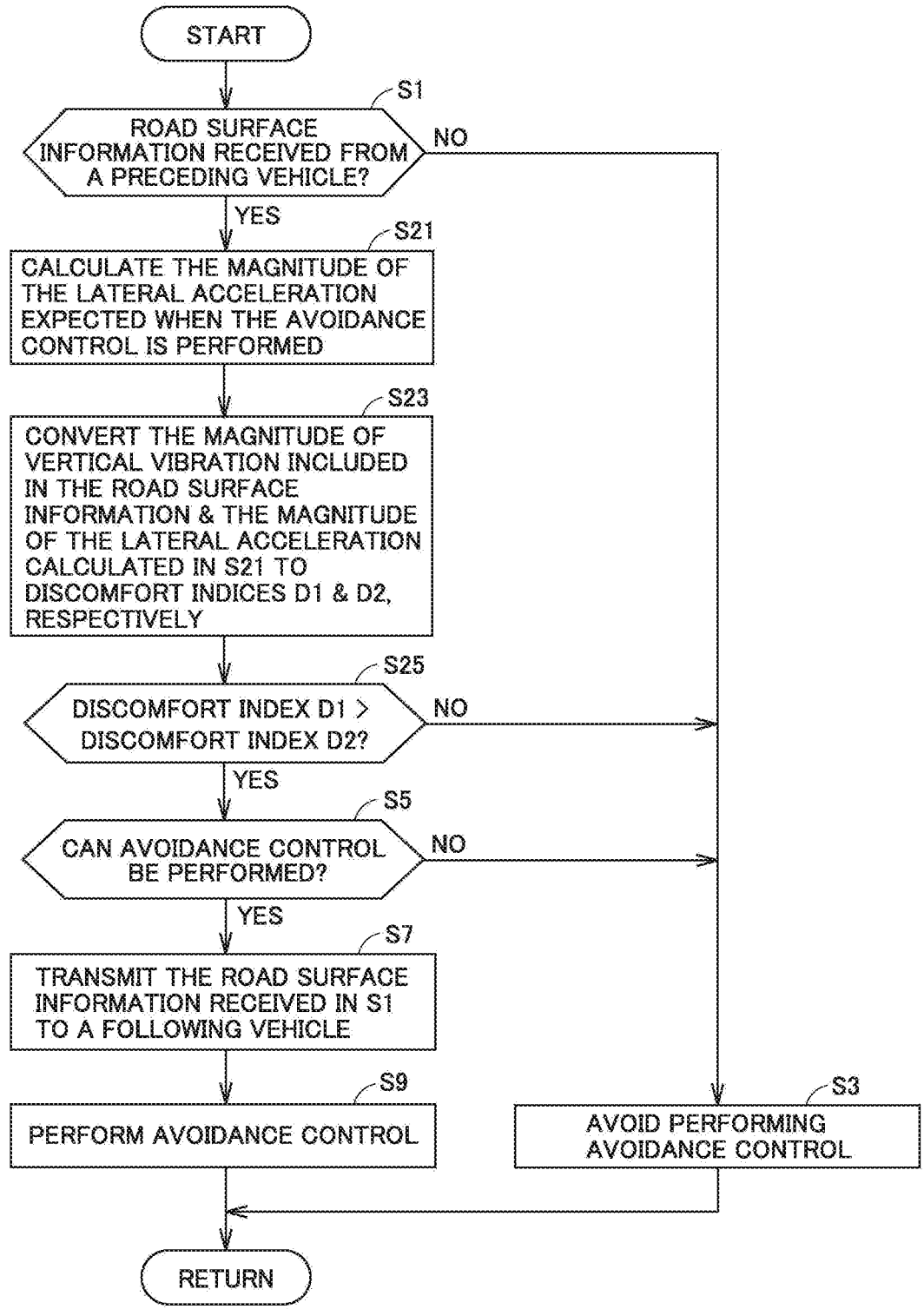
FIG. 10 is a flowchart of a process performed by an ECU of the vehicle according to the second embodiment.

FIG. 10 is a flowchart of a process performed by ECU 101 of vehicle 2 according to the second embodiment. The process of the flowchart starts whenever traveling information is received from a preceding vehicle periodically as prescribed for control. The process of the flowchart is that of the flowchart of FIG. 5 plus steps S21 to S25. The remainder of the process is the same as that of the FIG. 5 flowchart, and accordingly, identically denoted and will not be described repeatedly.

When road surface information is received from a preceding vehicle (YES in S1), ECU 101 calculates the magnitude of the lateral acceleration expected to be generated when the avoidance control is performed to avoid a specific spot on a road included in the road surface information (S21). The magnitude of the lateral acceleration is calculated based on, for example, the current vehicular speed of vehicle 2 and an amount of steering performed when the avoidance control is performed.

Subsequently, ECU 101 uses information indicating the magnitude of vertical vibration included in the road surface information received from the preceding vehicle in S1 and the first map stored in storage unit 121 to convert the magnitude of the vertical vibration into the occupant's discomfort index D1 (S23). In addition, ECU 101 uses information indicating the magnitude of the lateral acceleration calculated in S21 and the second map stored in storage unit 121 to convert the magnitude of the lateral acceleration into the occupant's discomfort index D2 (S23).

ECU 101 compares the discomfort index D1 with the discomfort index D2 (S25). When the discomfort index D1 is equal to or smaller than the discomfort index D2 (NO in S25), the occupant feels more discomfort with the lateral acceleration than the vertical vibration, and accordingly, ECU 101 ends the process without performing the avoidance control (S3). In that case, vehicle 2 passes over the specific spot on the road.

When the discomfort index D1 is larger than the discomfort index D2 (YES in S25), the occupant feels more discomfort with the vertical vibration than the lateral acceleration, and accordingly, after ECU 101 makes a decision for S5, ECU 101 transmits road surface information received from the preceding vehicle to a following vehicle (S7), and also performs the avoidance control to avoid the specific spot on the road (S9). Note that when ECU 101 performs the avoidance control, ECU 101 performs the process of the flowchart described with reference to FIG. 6.

Thus, vehicle 2 according to the second embodiment is configured to be able to select whether to perform the avoidance control or to just pass over a specific spot on a road. When performing the avoidance control would make an occupant feel more discomfort than passing over the specific spot on the road does, passing over the specific spot on the road without performing the avoidance control is selected. Alternatively, when performing the avoidance control would cause a larger amount of damage to loaded luggage than passing over a specific spot on a road does, passing over the specific spot on the road without performing the avoidance control is selected. In summary, when performing the avoidance control would decrease stability in the vehicle more than passing over a specific spot on a road does, passing over the specific spot on the road without performing the avoidance control is selected. This can suppress a decrease in stability in the vehicle.

Note that when the magnitude of the lateral acceleration expected to be generated by performing the avoidance control exceeds a threshold value, the avoidance control may not be performed. This is to prevent an occupant from feeling afraid of sudden steering.

(Second Modification)

In the second embodiment, an example has been described in which whether performing the avoidance control or passing over a specific spot on a road without performing the avoidance control is selected is determined based on which one of lateral acceleration generated by performing the avoidance control and vertical vibration caused by passing over the specific spot on the road is more uncomfortable for an occupant. Further, a first map is used to convert the vertical vibration into the occupant's discomfort index. A second map is used to convert the lateral acceleration into the occupant's discomfort index. The first map and the second map are determined in advance through an experiment, statistically, or the like. However, which one of the lateral acceleration and the vertical vibration feels more uncomfortable may vary depending on the occupant. Accordingly, in a second modification, an example in which the first map and the second map are learned will be described.

Vehicle 1 further includes in-vehicle camera 66 (see FIG. 7). In-vehicle camera 66 includes, for example, a plurality of cameras, and is configured to capture an image of an occupant in the vehicle. In-vehicle camera 66 captures an image in a moving image format at a predetermined frame rate, for example.

When ECU 101 performs the avoidance control, ECU 101 captures an image of an occupant with in-vehicle camera 66. Then, ECU 101 analyzes a plurality of images captured in the moving image format to detect the expression of the occupant. When ECU 101 detects that the occupant presents an expression showing discomfort, it can be estimated that the occupant has felt discomfort in response to lateral acceleration added. Accordingly, when ECU 101 detects that the occupant presents an expression showing discomfort, ECU 101 corrects the second map. Specifically, ECU 101 corrects the second map so that the discomfort index D2 converted from the magnitude of any lateral acceleration has an increased value.

Further, when ECU 101 does not perform the avoidance control and lets the vehicle pass over a specific spot on a road, ECU 101 captures an image of the occupant with in-vehicle camera 66. Then, ECU 101 analyzes a plurality of images captured in the moving image format to detect the expression of the occupant. When ECU 101 detects that the occupant presents an expression showing discomfort, it can be estimated that the occupant has felt discomfort in response to vertical vibration added. Accordingly, when ECU 101 detects that the occupant presents an expression showing discomfort, ECU 101 corrects the first map. Specifically, ECU 101 corrects the first map so that the discomfort index D1 converted from the magnitude of any vertical vibration has an increased value.

The first map and the second map can thus be repeatedly corrected and learned so that the preference of an occupant in vehicle 2 can be reflected in whether the avoidance control may be performed.

<Process Performed by ECU>

Figure 11:
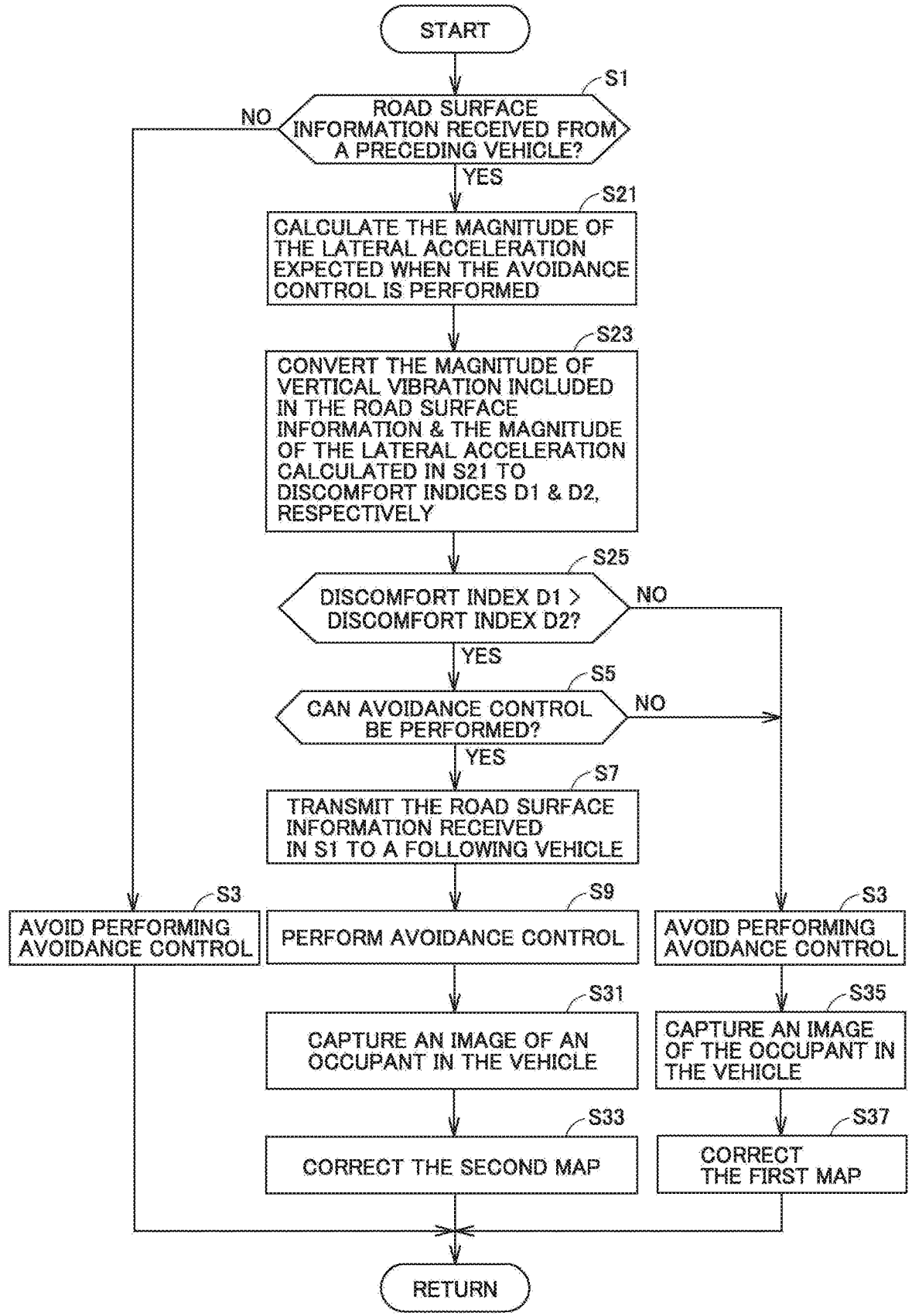
FIG. 11 is a flowchart of a process performed by an ECU of a vehicle according to a second modification.

FIG. 11 is a flowchart of a process performed by ECU 101 of vehicle 2 according to the second modification. The process of the flowchart starts whenever traveling information is received from a preceding vehicle periodically as prescribed for control. The process of the flowchart is that of the flowchart of FIG. 10 plus steps S31 to S37. The remainder of the process is the same as that of the FIG. 10 flowchart, and accordingly, identically denoted and will not be described repeatedly.

When ECU 101 performs the avoidance control (S9), ECU 101 captures an image of an occupant with in-vehicle camera 66 (S31). ECU 101 analyzes a plurality of images captured in the moving image format and corrects the second map according to the analysis result (S33). Specifically, when ECU 101 detects that the occupant presents an expression showing discomfort, ECU 101 corrects the second map so that the discomfort index D2 converted from the magnitude of any lateral acceleration has an increased value. When ECU 101 does not detect that the occupant presents an expression showing discomfort, ECU 101 does not correct the second map. Alternatively, when ECU 101 does not detect that the occupant presents an expression showing discomfort, ECU 101 may correct the second map so that the discomfort index D2 converted from the magnitude of any lateral acceleration has a decreased value.

When ECU 101 does not perform the avoidance control and the vehicle passes over a specific spot on a road (S3), ECU 101 captures an image of the occupant with in-vehicle camera 66 (S35). ECU 101 analyzes a plurality of images captured in the moving image format and corrects the first map according to the analysis result (S37). Specifically, when ECU 101 detects that the occupant presents an expression showing discomfort, ECU 101 corrects the first map so that the discomfort index D1 converted from the magnitude of any vertical vibration has an increased value. When ECU 101 does not detect that the occupant presents an expression showing discomfort, ECU 101 does not correct the first map. Alternatively, when ECU 101 does not detect that the occupant presents an expression showing discomfort, ECU 101 may correct the first map so that the discomfort index D1 converted from the magnitude of any vertical vibration has a decreased value.

As described above, in the second modification, an image of an occupant in a vehicle is captured when the avoidance control is performed or when the avoidance control is not performed and the vehicle passes over a specific spot on a road. Whether the occupant feels discomfort is determined based on the captured image. The first map or the second map is corrected according to whether the occupant feels discomfort. By repeatedly correcting and learning the first map and the second map, the preference of the occupant in vehicle 2 can be reflected in whether to perform the avoidance control.

Note that, in the example indicated in the second modification, an image captured with in-vehicle camera 66 is used to determine whether an occupant feels discomfort. Instead of or in addition to in-vehicle camera 66, an in-vehicle sound collector (not shown) can for example be used. When the avoidance control is performed or when the avoidance control is not performed and a vehicle passes over a specific spot on a road, the in-vehicle sound collector collects sound inside the vehicle. The collected sound data can be subjected to a sound analysis to detect whether the occupant feels discomfort as the avoidance control is performed or the vehicle passes over the specific spot on the road. That is, whether the occupant feels discomfort can be determined from the collected sound data.

Third Embodiment

In the first and second embodiments, an example has been described in which a specific spot on a road is an uneven spot, a puddle, or the like. A third embodiment will be described for a specific spot on a road that is a low μ spot. The example described in the third embodiment is applicable to a vehicle including at least battery 10 and motor generator 32 described in the first and second embodiments. Referring to FIG. 7 again, a vehicle 3 according to the third embodiment is the same as vehicle 2 according to the second embodiment except for an ECU 102. Accordingly, identical components are denoted by same reference numerals as vehicle 2 according to the second embodiment, and will not be described repeatedly.

For example, when drive wheel 55 of vehicle 3 passes over a specific spot on a road that is a low-μ, spot, drive wheel 55 temporarily slips (idles) and then again grips a road surface, that is, the drive wheel slips and grips. In the slip and grip, when drive wheel 55 grips a road surface, a reaction force load is input to motor generator 32, and as a result, the voltage VB of battery 10 instantaneously rises. Therefore, when the voltage VB of battery 10 instantaneously rises, it is assumed that a slip and grip has occurred as any of the drive wheels has passed over a specific spot on a road. More specifically, a prescribed value for detecting occurrence of slip and grip is previously determined, and which one of drive wheels 55 has passed over a specific spot on a road can be detected when the voltage VB of battery 10 presents a change exceeding the prescribed value. From a different point of view, it can be said that a low μ spot is a spot that gives a change to acceleration (deceleration) of motor generator 32 in an amount equal to or larger than a threshold value (a third threshold value) as the spot is passed over.

Which drive wheel 55 has passed over the specific spot is determined by using vehicular speed sensor 61. For example, when vehicle 1 is a front wheel drive vehicle, and the left front wheel passes over the specific spot and a slip and grip occurs, the rotation speed of the left front wheel becomes larger than those of the other wheels. By monitoring the rotation speed of drive wheel 55, which drive wheel has caused slip and grip can be determined. That is, by monitoring the rotation speed of drive wheel 55, the drive wheel that has passed over the specific spot can be identified. When the drive wheel that has passed over the specific spot can be identified, the location of the specific spot can be detected, as has been described in the first embodiment.

Road surface information according to the third embodiment includes the information of the location of a specific spot on a road, and in addition thereto, information indicating that a slip and grip has occurred. Note that the information indicating that a slip and grip has occurred may be replaced with information indicating passage over a low μ road.

An information acquisition unit 112 of ECU 102 acquires road surface information from a preceding vehicle via inter-vehicle communication device 80. A storage unit 122 of ECU 102 stores the second map and information of a discomfort index D3 of an occupant in the vehicle that is applied when a slip and grip occurs. The information of the discomfort index D3 according to the third embodiment is stored in storage unit 122 as a value uniquely determined for occurrence of slip and grip. A control unit 132 of ECU 102 performs various types of computations using, for example, road surface information, the second map, information of the discomfort index D3, and the like. For example, when battery 10 having voltage VB exceeding a prescribed value is detected, control unit 132 adds information indicating that a slip and grip has occurred to the road surface information and transmits the information to a following vehicle.

When the road surface information received from the preceding vehicle includes information indicating that a slip and grip has occurred, ECU 102 reads the discomfort index D3 from storage unit 122. Furthermore, ECU 102 compares the lateral acceleration expected to be generated by performing the avoidance control with the second map to convert the magnitude of the lateral acceleration expected to be generated by performing the avoidance control into the occupant's discomfort index D2.

ECU 102 compares the discomfort indices D2 and D3, and determines whether to perform the avoidance control according to the relationship in magnitude between the discomfort indices D2 and D3. Specifically, when the discomfort index D3 is larger than the discomfort index D2 (D3>D2), the occupant feels more discomfort with slip and grip, and accordingly, ECU 102 performs the avoidance control to avoid the specific spot on the road. In contrast, when the discomfort index D3 is equal to or smaller than the discomfort index D2 (D3≤D2), the occupant feels more discomfort with the lateral acceleration, and accordingly, ECU 102 does not perform the avoidance control and the vehicle passes over the specific spot on the road.

<Process Performed by ECU>

Figure 12:
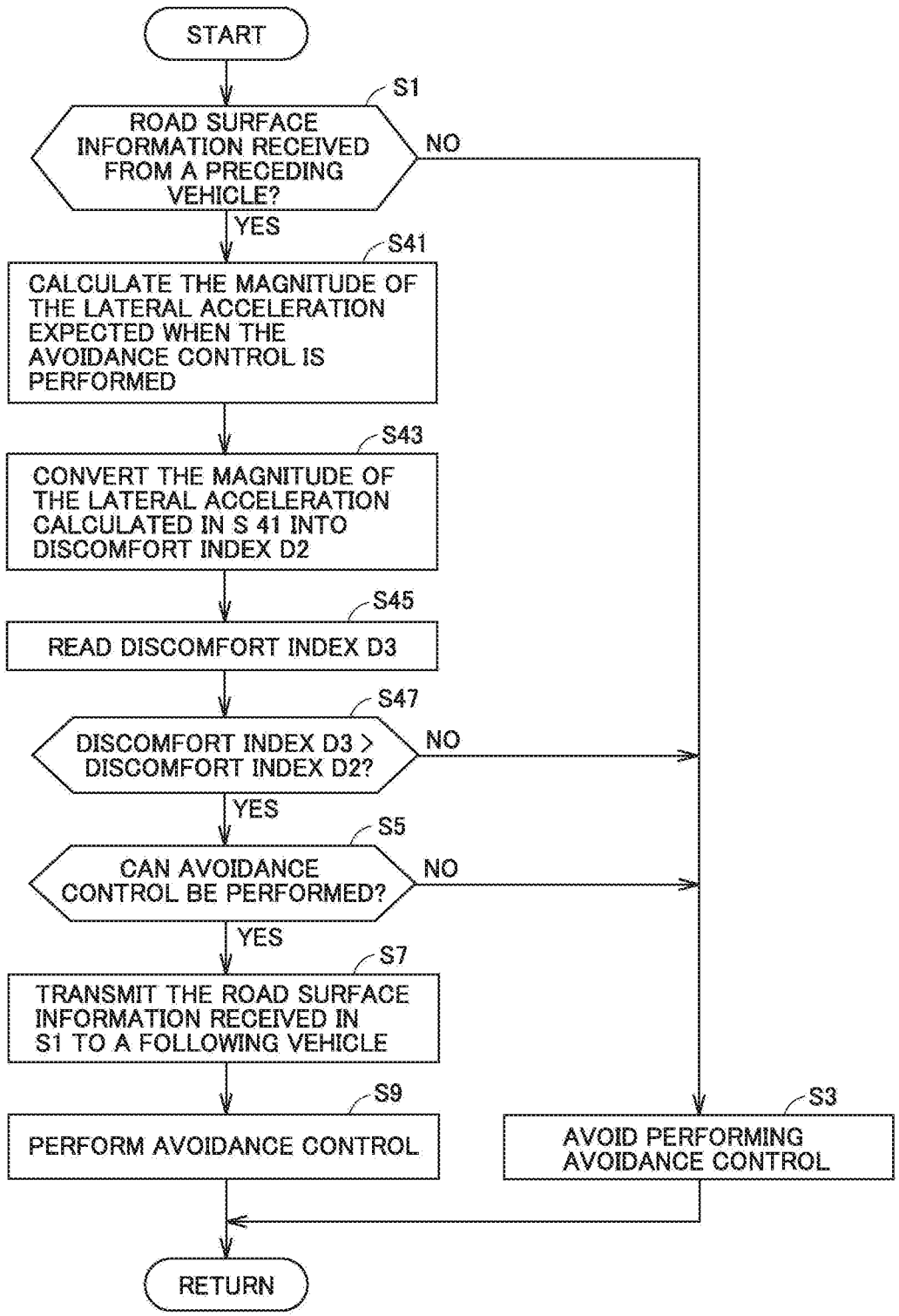
FIG. 12 is a flowchart of a process performed by an ECU of a vehicle according to a third embodiment.

FIG. 12 is a flowchart of a process performed by ECU 102 of vehicle 3 according to the third embodiment. The process of the flowchart starts whenever traveling information is received from a preceding vehicle periodically as prescribed for control. The process of the flowchart is that of the flowchart of FIG. 5 plus steps S41 to S47. The remainder of the process is the same as that of the FIG. 5 flowchart, and accordingly, identically denoted and will not be described repeatedly.

When road surface information including information indicating that a slip and grip has occurred is received from a preceding vehicle (YES in S1), ECU 102 calculates the magnitude of the lateral acceleration expected to be generated when the avoidance control is performed to avoid a specific spot on a road (a low μ road) included in the road surface information (S41). The magnitude of the lateral acceleration is calculated based on, for example, the current vehicular speed of vehicle 3 and an amount of steering performed when the avoidance control is performed.

Subsequently, ECU 102 uses the magnitude of the lateral acceleration calculated in S41 and the second map stored in storage unit 122 to convert the magnitude of the lateral acceleration into an occupant's discomfort index D2 (S43).

ECU 102 reads the discomfort index D3 from storage unit 122 based on the information included in the road surface information received from the preceding vehicle in S1 and indicating that a slip and grip has occurred (S45).

ECU 102 compares the discomfort index D2 with the discomfort index D3 (S47). When the discomfort index D3 is equal to or smaller than the discomfort index D2 (NO in S47), the occupant feels more discomfort with the lateral acceleration than the slip and grip, and accordingly, ECU 102 ends the process without performing the avoidance control (S3). In that case, vehicle 3 passes over the specific spot on the road.

When the discomfort index D3 is larger than the discomfort index D2 (YES in S47), the occupant feels more discomfort with the slip and grip than the lateral acceleration, and accordingly, after ECU 102 makes a decision for S5, ECU 102 transmits the road surface information received from the preceding vehicle to a following vehicle (S7), and also performs the avoidance control to avoid the specific spot on the road (S9). Note that when ECU 102 performs the avoidance control, ECU 102 performs the process of the flowchart described with reference to FIG. 6.

Thus, vehicle 3 according to the third embodiment detects occurrence of slip and grip based on an instantaneous increase in voltage VB of battery 10. Then, based on the rotation speed of drive wheel 55, which one of drive wheels 55 has slipped and gripped (that is, which one of drive wheels 55 has passed over a specific spot on a road) is determined. By identifying the drive wheel that has slipped and gripped, where the specific spot on the road is located is detected. Information of the location of the specific spot on the road that the drive wheel has passed over can be included in road surface information and thus transmitted to a following vehicle to increase a possibility that the following vehicle can avoid that specific spot on the road.

(Third Modification)

When battery 10 has an SOC (state of charge) falling below a threshold SOC, it may be desirable to prioritize suppressing power consumption rather than ensuring stability in the vehicle. This is especially true when vehicle 3 is an electric vehicle that uses only battery 10 as a power source.

When the avoidance control is performed in vehicle platooning, vehicle 3 departs from the platoon, and as a result, air resistance decreased by the presence of a preceding vehicle increases. In order to maintain vehicular speed with air resistance increased, power consumption may increase. Accordingly, when battery 10 has an SOC falling below a threshold SOC, vehicle 3 according to the third embodiment avoids performing the avoidance control to suppress power consumption.

The SOC of battery 10 is calculated by ECU 102, for example. As a method of calculating the SOC, various known methods such as a method based on integration of values of a current (coulomb counting) or a method based on estimating an open circuit voltage (OCV) can be adopted.

The threshold SOC may be set as needed for example based on an SOC required to travel from the current location to a destination (or a power supply point). When a target SOC which is desired to remain when the vehicle arrives at the destination is set, the threshold SOC may be set with the target SOC considered.

Figure 13:
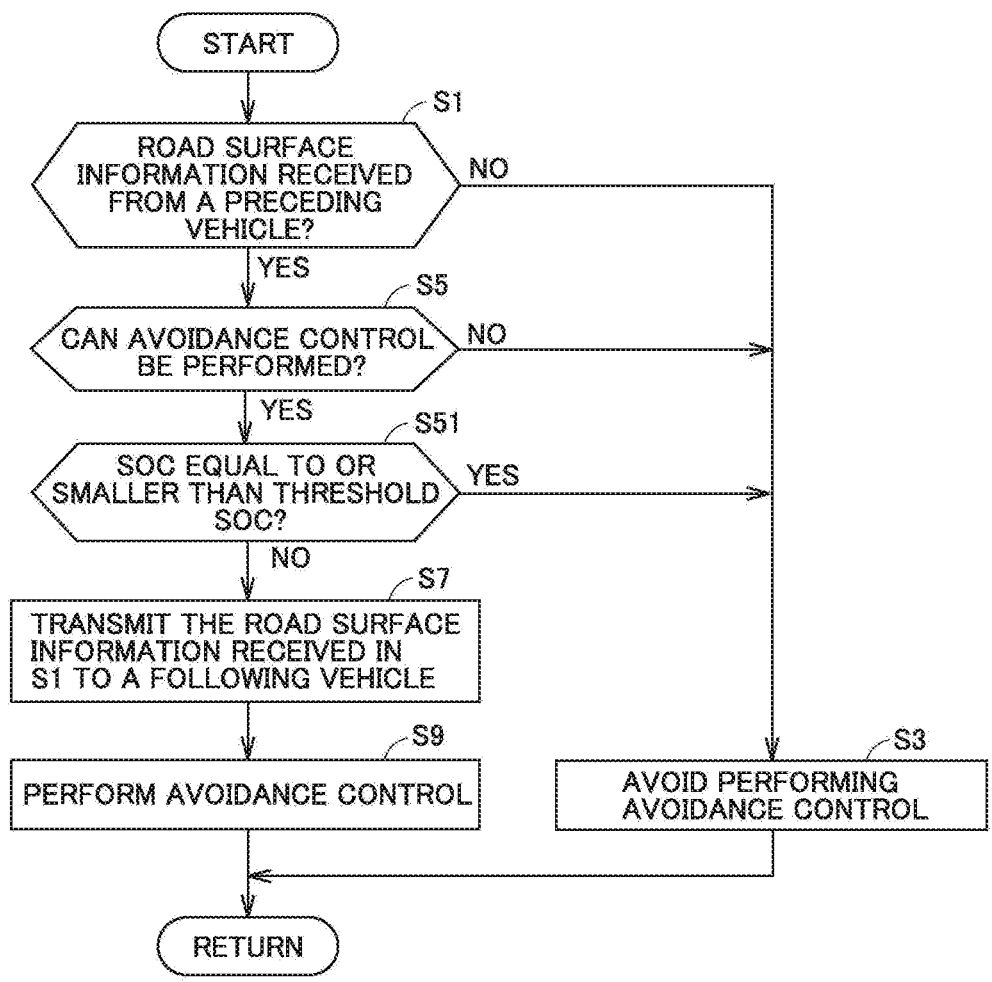
FIG. 13 is a flowchart of a process performed by an ECU of a vehicle according to a third modification.

FIG. 13 is a flowchart of a process performed by ECU 102 of vehicle 3 according to the third modification. The process of the flowchart is that of the flowchart of FIG. 5 plus step S51. The remainder of the process is the same as that of the FIG. 5 flowchart, and accordingly, identically denoted and will not be described repeatedly.

When it is determined in S5 that the avoidance control can be performed (YES in S5), ECU 102 determines whether battery 10 has an SOC equal to or smaller than the threshold SOC (S51). When battery 10 has an SOC equal to or smaller than the threshold SOC (YES in S51), ECU 102 proceeds to S3 and does not perform the avoidance control. In that case, vehicle 3 passes over a specific spot on a road.

In contrast, when battery 10 has an SOC larger than the threshold SOC (NO in S51), ECU 102 proceeds to S7 and S9 to perform the avoidance control. Note that when ECU 102 performs the avoidance control, ECU 102 performs the process of the flowchart described with reference to FIG. 6.

Thus vehicle 3 according to the third modification does not perform the avoidance control when battery 10 has an SOC falling below the threshold SOC and it is desired to prioritize suppressing power consumption rather than ensuring stability in the vehicle. Power consumption can be suppressed.

(Fourth Modification)

When a vehicle traveling in a platoon excluding a leading vehicle is compared with a vehicle traveling alone, the former receives less air for cooling battery 10. This is because the presence of a preceding vehicle reduces air resistance. Therefore, when a vehicle traveling in a platoon excluding a leading vehicle is compared with a vehicle traveling alone the former tends to have battery temperature TB higher than the latter. It is known that battery 10 deteriorates fast when battery temperature TB attains a prescribed temperature or higher. Herein, a first threshold temperature Tth1 is set as a temperature set to prevent battery 10 from deteriorating. The first threshold temperature Tth1 is set based on, for example, the specification of battery 10 and an experiment using battery 10.

When a vehicle traveling in a platoon excluding the leading vehicle performs the avoidance control, the vehicle departs from the platoon, and accordingly, the air resistance that has been reduced by the presence of a preceding vehicle increases, and more cooling air is received. Battery 10 is thus easily cooled. In contrast, in order to maintain vehicular speed, battery 10's output power may be increased to correspond to the increase in air resistance. It takes time to cool battery 10 with air, and when the avoidance control is performed, battery temperature TB may temporarily increase due to the increase of the output power.

Figure 14:
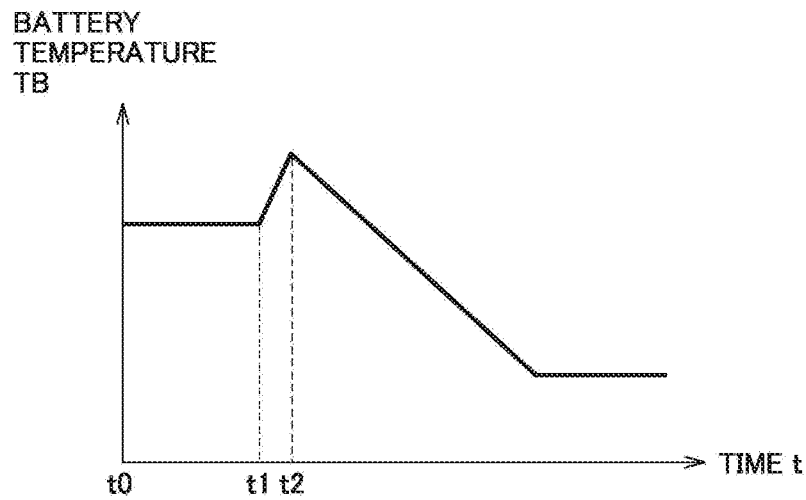
FIG. 14 is a diagram for illustrating an example of variation in temperature of the battery's temperature.

FIG. 14 is a diagram for illustrating an example of how battery temperature TB varies. In FIG. 14, the horizontal axis represents time t and the vertical axis represents battery temperature TB.

Referring to FIG. 14, it is assumed that vehicle 3 travels in a platoon from time t0 to time t1. It is assumed that vehicle 3 performs the avoidance control at time t1. As vehicle 3 has performed the avoidance control, vehicle 3 increases power output from battery 10 in order to maintain its vehicular speed. Therefore, the battery temperature TB increases from time t1 to time t2. At time t2, an effect of air on battery 10 to cool it appears, and the battery temperature TB decreases.

When the avoidance control is performed with the battery temperature TB being lower than the first threshold temperature Tth1 but relatively high, and the battery temperature TB temporarily rises, the battery temperature TB may exceed the first threshold temperature Tth1. When the battery temperature TB exceeds the first threshold temperature Tth1, battery 10 may deteriorate.

Accordingly, vehicle 3 according to the fourth modification does not perform the avoidance control when the battery temperature TB is equal to or higher than a second threshold temperature Tth2(<Tth1). In other words, vehicle 3 performs the avoidance control when the battery temperature TB is lower than the second threshold temperature Tth2. The second threshold temperature Tth2 is a temperature lower than the first threshold temperature Tth1, and is set in consideration of a temporary increase of the battery temperature TB due to performing the avoidance control. The second threshold temperature Tth2 is set, for example, based on the first threshold temperature Tth1 and vehicular speed.

Figure 15:
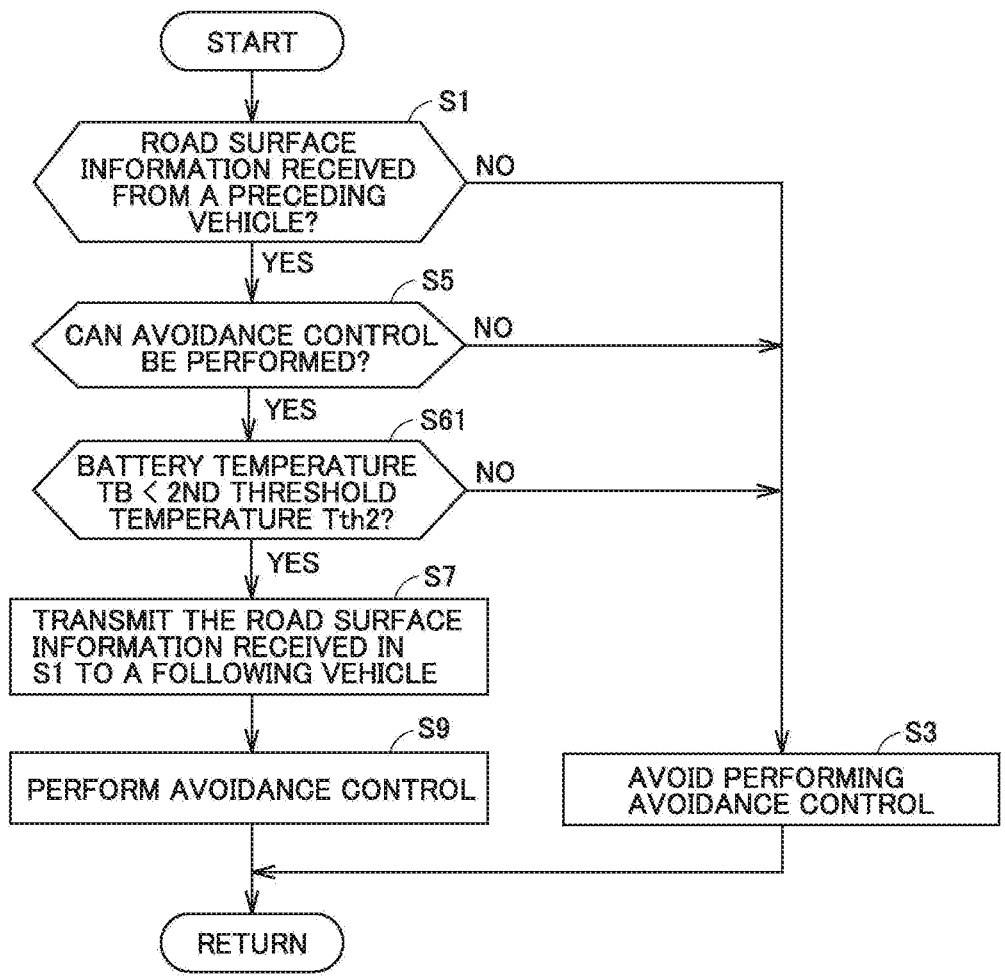
FIG. 15 is a flowchart of a process performed by an ECU of a vehicle according to a fourth modification.

FIG. 15 is a flowchart of a process performed by ECU 102 of vehicle 3 according to the fourth modification. The process of the flowchart is that of the flowchart of FIG. 5 plus step S61. The remainder of the process is the same as that of the FIG. 5 flowchart, and accordingly, identically denoted and will not be described repeatedly.

When it is determined in S5 that the avoidance control can be performed (YES in S5), ECU 102 determines whether the battery temperature TB is lower than the second threshold temperature Tth2 (S61). When the battery temperature TB is equal to or higher than second threshold temperature Tth2 (NO in S61), ECU 102 proceeds to S3 and does not perform the avoidance control. In that case, vehicle 3 passes over a specific spot on a road.

In contrast, when the battery temperature TB is lower than second threshold temperature Tth2 (YES in S61), ECU 102 proceeds to S7 and S9 to perform the avoidance control. When ECU 102 performs the avoidance control, ECU 102 performs the process of the flowchart described with reference to FIG. 6.

Thus, vehicle 3 according to the fourth modification does not perform the avoidance control when the battery temperature TB is equal to or higher than the second threshold temperature Tth2. This can prevent the battery temperature TB from exceeding the first threshold temperature Tth1 as the avoidance control is performed, and hence suppress deterioration of battery 10.

Fourth Embodiment

In recent years, contactlessly chargeable vehicles are increasingly used. Along with this, power supply facilities for supplying power to such vehicles are also increasingly constructed. Examples of the power supply facilities include a power transmitting device embedded on a road at predetermined intervals, a power transmitting device installed on a road shoulder at predetermined intervals, and the like. In a fourth embodiment, a contactlessly chargeable vehicle will be described.

Figure 16:
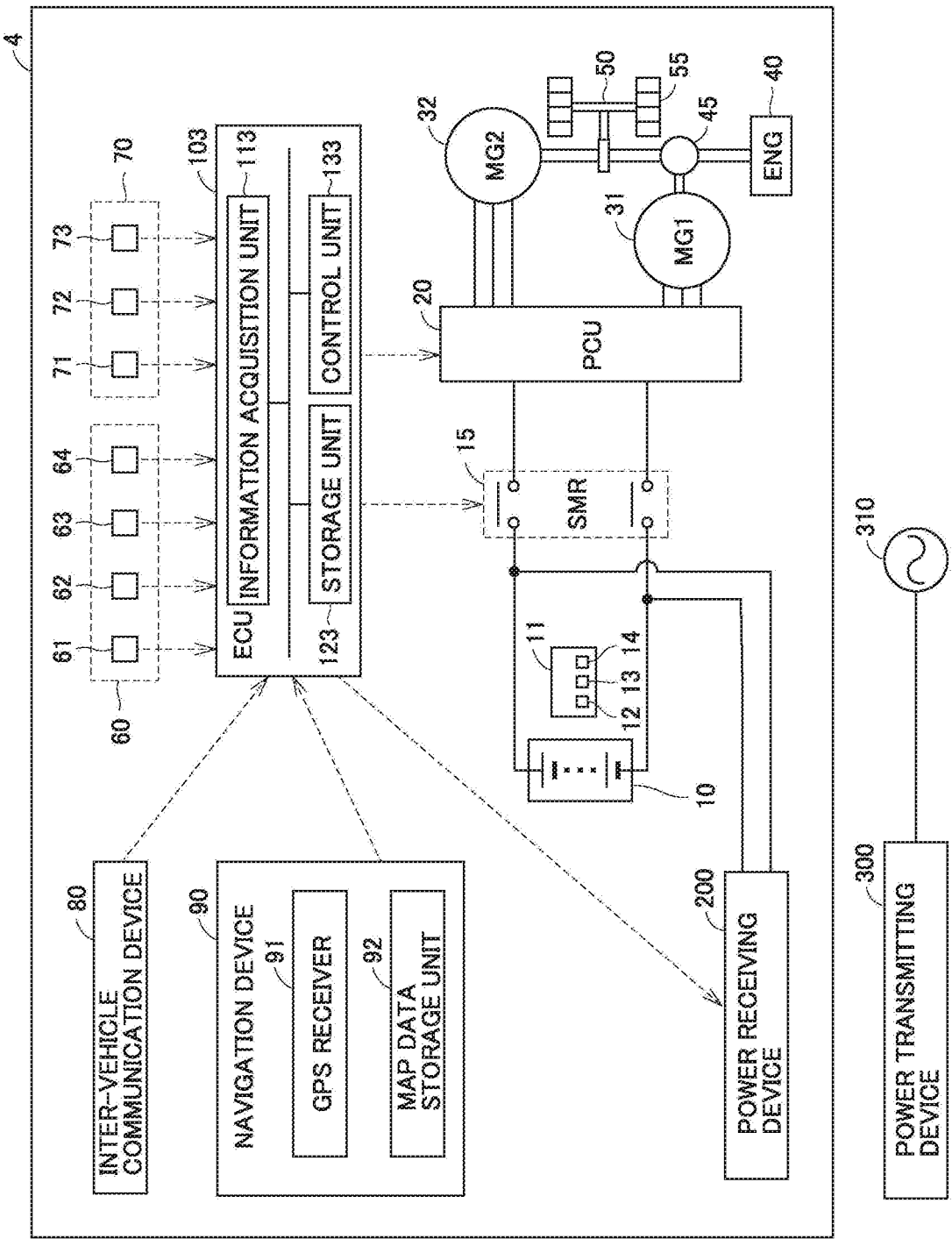
FIG. 16 is a block diagram for illustrating an example configuration of a vehicle and a power transmitting device according to a fourth embodiment.

FIG. 16 is a block diagram for illustrating an example configuration of a vehicle 4 and a power transmitting device 300 according to the fourth embodiment. Referring to FIG. 16, vehicle 4 corresponds to vehicle 1 shown in FIG. 1 with ECU 100 replaced with an ECU 103 and a power receiving device 200 added thereto. The remainder in configuration is identical to that of vehicle 1 described with reference to FIG. 1, and accordingly, will not be described repeatedly.

Referring to FIG. 16, power transmitting device 300 is embedded on a road at predetermined intervals. Power transmitting device 300 includes a power transmitting coil (not shown). Power transmitting device 300 receives power supplied from an AC power supply 310 (for example, a commercial system power supply).

Power receiving device 200 is provided, for example, at a bottom surface of vehicle 4. Power receiving device 200 includes a power receiving coil (not shown). When vehicle 4 passes over power transmitting device 300 such that the power receiving coil of power receiving device 200 faces the power transmitting coil of power transmitting device 300, electric power is transmitted contactlessly through a magnetic field from the power transmitting coil of power transmitting device 300 to the power receiving coil of power receiving device 200.

ECU 103 controls power receiving device 200. ECU 103 controls a power receiving ECU to charge battery 10 when passing over power transmitting device 300 embedded in a road, for example. Where power transmitting device 300 is embedded is stored in map data storage unit 92 of navigation device 90, for example. Alternatively, when the distance between vehicle 4 and power transmitting device 300 becomes shorter than a prescribed distance, wireless communication may be established therebetween, and where power transmitting device 300 is embedded may be specified through wireless communication.

As has been described in the third modification above, when battery 10 of a vehicle traveling in a platoon has an SOC falling below the threshold SOC, it may be desirable to prioritize suppressing power consumption rather than ensuring stability in the vehicle. When battery 10 of contactlessly chargeable vehicle 4 has an SOC falling below the threshold SOC, vehicle 4 can actively travel on a spot on a road where power transmitting device 300 is embedded to receive power from power transmitting device 300.

When power transmitting device 300 is embedded in a road, it is typically embedded at a substantially central position in a lane. It is known that contactless charging is efficiently performed when the power receiving coil of power receiving device 200 and the power transmitting coil of power transmitting device 300 are aligned so as to face each other. That is, battery 10 can be charged efficiently by passing exactly above power transmitting device 300.

When a vehicle is contactlessly charged, and the avoidance control is simultaneously performed, the vehicle travels leftward or rightward in a lane or travels across lanes in order to avoid a specific spot on a road, and the vehicle may be contactlessly charged inefficiently.

Accordingly, when battery 10 has an SOC falling below the threshold SOC, ECU 103 does not perform the avoidance control in order to prioritize charging battery 10. Thus, battery 10 can be efficiently charged. The threshold SOC in the fourth embodiment may be the same as or different from the threshold SOC described in the third modification. Vehicle 4 according to the fourth embodiment allows battery 10 to be charged contactlessly while the vehicle travels in a platoon, and thus enables a threshold SOC smaller than that described in the third modification.

<Process Performed by ECU>

Figure 17:
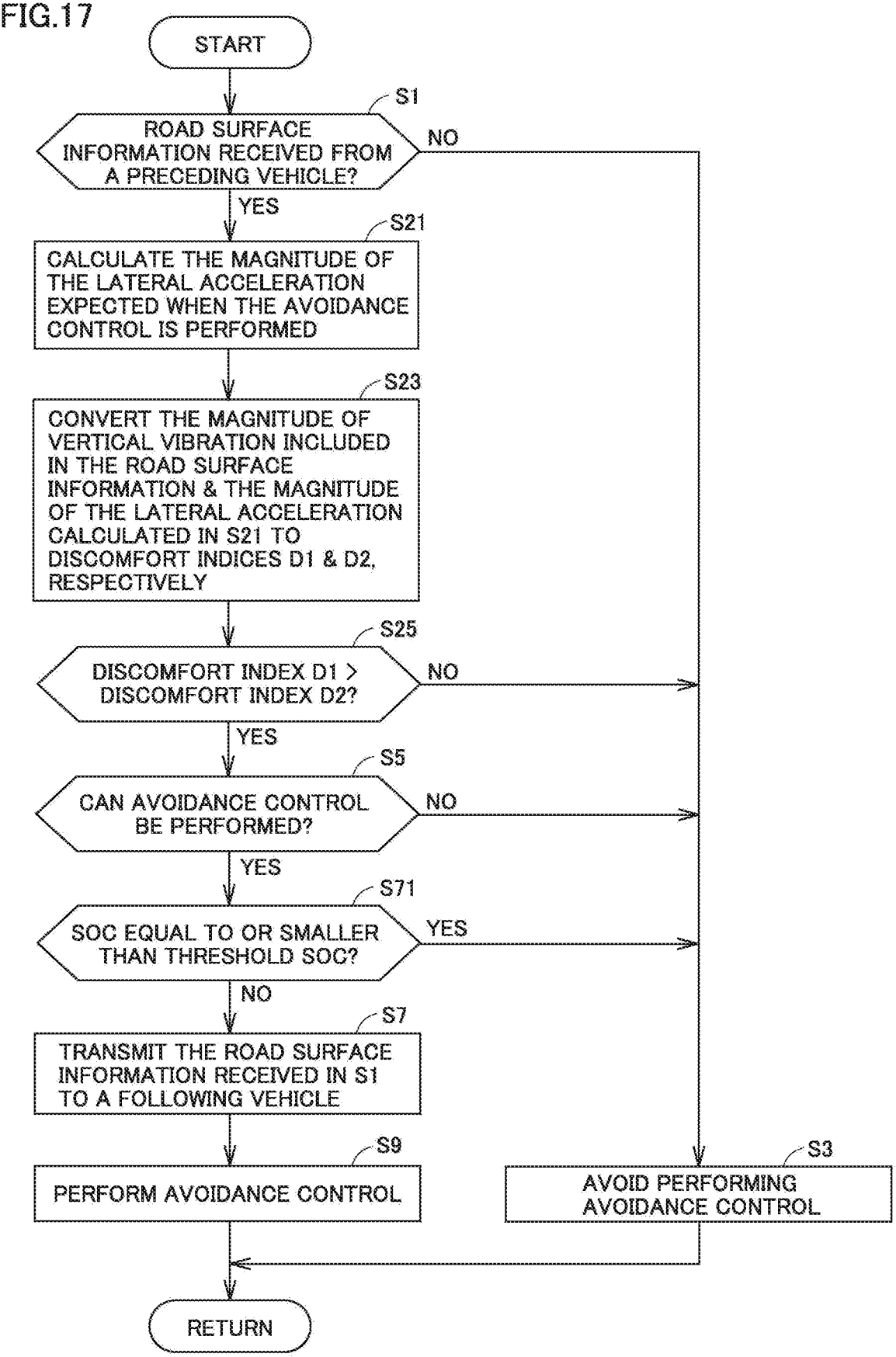
FIG. 17 is a flowchart of a process performed by an ECU of the vehicle according to the fourth embodiment.

FIG. 17 is a flowchart of a process performed by ECU 103 of vehicle 4 according to the fourth embodiment. The process of the flowchart is that of the flowchart of FIG. 10 plus step S71. The remainder of the process is the same as that of the FIG. 10 flowchart, and accordingly, identically denoted and will not be described repeatedly.

When it is determined in S5 that the avoidance control can be performed (YES in S5), ECU 103 determines whether battery 10 has an SOC equal to or smaller than the threshold SOC (S71). When battery 10 has an SOC equal to or smaller than the threshold SOC (YES in S71), ECU 103 proceeds to S3 and does not perform the avoidance control. Vehicle 4 can thus pass exactly above power transmitting device 300 and battery 10 can be charged efficiently.

In contrast, when battery 10 has an SOC larger than the threshold SOC (NO in S71), ECU 103 proceeds to S7 and S9 to perform the avoidance control. Note that when ECU 103 performs the avoidance control, ECU 103 performs the process of the flowchart described with reference to FIG. 6.

Thus, vehicle 4 according to the fourth embodiment does not perform the avoidance control when battery 10 has an SOC falling below the threshold SOC and it is desired to prioritize charging battery 10 rather than ensuring stability in the vehicle. This allows vehicle 4 to pass exactly above power transmitting device 300 and battery 10 to be charged efficiently.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle capable of vehicle platooning with a plurality of such vehicles travelling in a platoon, comprising:
   a communication device that bidirectionally communicates with a neighboring vehicle and receives, from a preceding vehicle traveling ahead in the platoon, road surface information of a surface of a road travelled by the preceding vehicle; and
   a control device that performs avoidance control to avoid a spot on the road when the preceding vehicle having passed over the spot on the road is detected based on the road surface information, the spot on the road providing (i) a change equal to or larger than a first threshold value to acceleration of the preceding vehicle as the preceding vehicle passes over the spot on the road, (ii) a change equal to or larger than a second threshold value to acceleration of a vehicular wheel of the preceding vehicle as the preceding vehicle passes over the spot on the road, or (iii) a change equal to or larger than a third threshold value to acceleration of a travelling motor of the preceding vehicle as the preceding vehicle passes over the spot on the road, wherein
   even when the preceding vehicle having passed over the spot on the road is detected, the control device does not perform the avoidance control if one of the following conditions is additionally satisfied: (a) a second parameter is larger than a first parameter, the first parameter indicating vertical acceleration or longitudinal acceleration generated as the vehicle passes over the spot on the road, the second parameter indicating lateral acceleration generated as the avoidance control is performed or (b) the lateral acceleration generated by the avoidance control exceeds a threshold value.

2. The vehicle according to claim 1, further comprising a detection device that detects that the vehicle has passed over the spot on the road, wherein when the detection device detects that the vehicle has passed over the spot on the road, the control device:
   locates the spot on the road that the vehicle has passed over, based on an output received from the detection device;
   adds information of the spot on the road to the road surface information; and
   controls the communication device to transmit the road surface information to a vehicle traveling behind in the platoon.

3. The vehicle according to claim 1, further comprising an in-vehicle device that captures an image in the vehicle and/or collects sound in the vehicle, wherein
   the control device uses the captured image and/or sound to detect discomfort felt by an occupant in the vehicle, and
   when the avoidance control is not performed and the vehicle passes over the spot on the road, and when the control device detects that the occupant feels discomfort, the control device corrects the first parameter to increase the first parameter,
   whereas when the avoidance control is performed, and when the control device detects that the occupant feels discomfort, the control device corrects the second parameter to increase the second parameter.

4. The vehicle according to claim 1, further comprising:
   a traveling motor; and
   a battery as a power supply source for the traveling motor, wherein
   when the battery has a voltage presenting a change exceeding a prescribed value applied for detecting occurrence of slip and grip, the control device:
   identifies which drive wheel slips and grips,
   adds, to the road surface information, information of the spot on the road passed over by the drive wheel, and controls the communication device to transmit the road surface information to a vehicle traveling behind in the platoon.

5. The vehicle according to claim 1, further comprising:
a traveling motor; and
a battery as a power supply source for the traveling motor, wherein
even when the preceding vehicle having passed over the spot on the road is detected, the control device does not perform the avoidance control when an amount of charge stored in the battery falls below a threshold amount of charge.

6. The vehicle according to claim 4, wherein
even when the preceding vehicle having passed over the spot on the road is detected, the control device does not perform the avoidance control when an amount of charge stored in the battery falls below a threshold amount of charge.

7. The vehicle according to claim 1, further comprising:
a traveling motor;
a battery as a power supply source for the traveling motor; and
a temperature sensor to sense the battery's temperature, wherein
even when the preceding vehicle having passed over the spot on the road is detected, the control device does not perform the avoidance control when the battery's temperature exceeds a threshold temperature.

8. The vehicle according to claim 4, further comprising a temperature sensor to sense the battery's temperature, wherein
even when the preceding vehicle having passed over the spot on the road is detected, the control device does not perform the avoidance control when the battery's temperature exceeds a threshold temperature.

* * * * *